(12) United States Patent
Williams et al.

(10) Patent No.: US 10,086,223 B2
(45) Date of Patent: Oct. 2, 2018

(54) FIXED SYSTEMS AND METHODS FOR EXTINGUISHING INDUSTRIAL TANK FIRES, WITH AND WITHOUT FIXED ROOF, INCLUDING AERATED FOAM PROJECTING NOZZLES AND CENTER DIRECTED NOZZLES

(71) Applicant: Tyco Fire & Security GmbH, Neuhausen Am Rheinfall (CH)

(72) Inventors: Dwight P. Williams, Vidor, TX (US); Casey R. Spears, Nederland, TX (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 0 days.

(21) Appl. No.: 15/351,656

(22) Filed: Nov. 15, 2016

(65) Prior Publication Data

US 2017/0144004 A1    May 25, 2017

Related U.S. Application Data

(62) Division of application No. 13/261,640, filed as application No. PCT/US2011/001768 on Oct. 17, 2011, now Pat. No. 9,586,069.

(60) Provisional application No. 61/455,367, filed on Oct. 19, 2010, provisional application No. 61/461,413, filed on Jan. 18, 2011, provisional application No. 61/463,296, filed on Feb. 14, 2011, provisional application No. 61/519,071, filed on May 16, 2011.

(51) Int. Cl.
 *A62C 31/05* (2006.01)
 *A62C 31/12* (2006.01)
 *B05B 1/26* (2006.01)
 *A62C 3/06* (2006.01)
 *B05B 1/14* (2006.01)

(52) U.S. Cl.
 CPC .............. *A62C 3/065* (2013.01); *A62C 31/05* (2013.01); *A62C 31/12* (2013.01); *B05B 1/26* (2013.01); *B05B 1/265* (2013.01); *B05B 1/14* (2013.01)

(58) Field of Classification Search
 CPC ........... A62C 3/06; A62C 31/12; A62C 3/065; B05B 1/14; B05B 1/26
 USPC ............................................... 169/44, 46, 68
 See application file for complete search history.

(56) References Cited

U.S. PATENT DOCUMENTS

| | | |
|---|---|---|
| 1,011,315 A | 12/1911 | Canner |
| 2,376,881 A | 5/1945 | Adolph |
| 2,389,642 A | 11/1945 | Schellin et al. |

(Continued)

FOREIGN PATENT DOCUMENTS

| | | |
|---|---|---|
| CN | 101115532 | 1/2008 |
| DE | 838249 | 5/1952 |

(Continued)

OTHER PUBLICATIONS

Search Report for Chinese Patent Application No. 01180661170.5 dated Dec. 9, 2014 with English Translation, 5 pages.

(Continued)

*Primary Examiner* — Chee-Chong Lee
(74) *Attorney, Agent, or Firm* — Foley & Lardner LLP

(57) ABSTRACT

Fixed systems and method for extinguishing large scale industrial tank fires, with and without fixed roofs, and featuring aerated foam projecting nozzles and including fixed center directed nozzles.

17 Claims, 16 Drawing Sheets

(56) References Cited

U.S. PATENT DOCUMENTS

| | | | |
|---|---|---|---|
| 2,478,998 A * | 8/1949 | Boyd | B01F 5/0408 138/37 |
| 2,512,456 A * | 6/1950 | Boyd | B01F 5/0408 239/428 |
| 2,618,346 A * | 11/1952 | Bedford | A62C 3/06 169/66 |
| 2,695,069 A * | 11/1954 | Boerner | A62C 5/002 169/70 |
| 2,772,743 A | 12/1956 | Eggleston | |
| 3,094,171 A | 6/1963 | Gagliardo | |
| 3,363,842 A | 1/1968 | Burns | |
| 3,741,309 A | 6/1973 | McCulloch | |
| 3,876,010 A | 4/1975 | Bloomquist et al. | |
| 3,896,881 A | 7/1975 | De Boer | |
| 4,064,944 A | 12/1977 | McClure et al. | |
| 4,069,873 A | 1/1978 | McClure | |
| 4,197,914 A * | 4/1980 | Grey | A62C 3/10 114/201 R |
| 4,640,461 A | 2/1987 | Williams | |
| 4,674,686 A | 6/1987 | Trapp | |
| 4,781,252 A | 11/1988 | Wilburn et al. | |
| 4,893,681 A * | 1/1990 | Flandre | A62C 3/06 169/14 |
| 4,944,460 A | 7/1990 | Steingass | |
| 5,012,979 A | 5/1991 | Williams | |
| 5,167,285 A | 12/1992 | Williams et al. | |
| 5,312,041 A | 5/1994 | Williams | |
| 5,566,766 A | 10/1996 | Williams | |
| 5,590,719 A | 1/1997 | McLouglin | |
| 5,779,159 A | 7/1998 | Williams et al. | |
| 5,848,752 A | 12/1998 | Kolacz | |
| 5,887,789 A * | 3/1999 | Szabo | B65B 3/22 239/1 |
| 5,893,519 A | 4/1999 | Cavaretta et al. | |
| 5,913,366 A | 6/1999 | Williams et al. | |
| 5,992,529 A | 11/1999 | Williams | |
| 6,089,474 A | 7/2000 | Marino | |
| 6,102,308 A | 8/2000 | Steingass et al. | |
| 6,293,294 B1 * | 9/2001 | Loeb | B01F 5/0405 137/1 |
| 6,321,771 B1 | 11/2001 | Brazier et al. | |
| 6,877,676 B2 | 4/2005 | Saner | |
| 7,097,120 B2 | 8/2006 | Marino | |
| 7,114,575 B2 | 10/2006 | De Anda-Uribe et al. | |
| 7,207,501 B2 | 4/2007 | Hanratty | |
| 8,215,412 B2 | 7/2012 | Williams et al. | |
| 8,261,843 B2 | 9/2012 | Daspit et al. | |
| 2002/0125015 A1 | 9/2002 | Crabtree et al. | |
| 2003/0213602 A1 | 11/2003 | Williams | |
| 2004/0084192 A1 | 5/2004 | Crabtree | |
| 2004/0123991 A1 | 7/2004 | Hanratty | |
| 2004/0140106 A1 * | 7/2004 | De Anda-Uribe | A62C 31/24 169/66 |
| 2007/0119605 A1 | 5/2007 | Williams | |
| 2009/0020629 A1 | 1/2009 | Marino | |
| 2009/0114405 A1 | 5/2009 | Schmitz et al. | |
| 2009/0242216 A1 | 10/2009 | Daspit et al. | |
| 2010/0163256 A1 | 7/2010 | Williams | |
| 2012/0085840 A1 | 4/2012 | Marino | |

FOREIGN PATENT DOCUMENTS

| | | |
|---|---|---|
| DE | 26 12 822 A1 | 9/1977 |
| FR | 2552336 A1 | 3/1985 |
| FR | 2856603 A1 | 12/2004 |
| JP | S08-7580 | 6/1933 |
| JP | S55-114657 | 2/1979 |
| JP | S5722939 Y2 | 5/1982 |
| JP | S61-16160 | 1/1986 |
| JP | H05-184694 | 7/1993 |
| JP | H05-231587 | 9/1993 |
| JP | H08-74777 | 3/1996 |
| JP | 2610398 B2 | 5/1997 |
| JP | H09-299499 | 11/1997 |
| JP | 2977921 B2 | 11/1999 |
| JP | 2000325490 | 11/2000 |
| JP | 2001-500397 | 1/2001 |
| JP | 3213057 B2 | 9/2001 |
| JP | 2002-172183 | 6/2002 |
| JP | 3448303 B2 | 9/2003 |
| JP | 2008-517635 | 5/2008 |
| JP | 4233681 B2 | 3/2009 |
| JP | 2009-514574 | 4/2009 |
| JP | 2009514574 A | 4/2009 |
| JP | 5229939 B2 | 7/2013 |
| WO | WO 98/03226 A1 | 1/1998 |
| WO | WO 00/21614 | 4/2000 |
| WO | WO 01/77551 A2 | 10/2001 |
| WO | WO 2006/023434 A1 | 3/2006 |
| WO | WO 2008/153795 A1 | 12/2008 |
| WO | WO 2008/156522 A2 | 12/2008 |

OTHER PUBLICATIONS

International Search Report for International Patent Appln. No. PCT/US2011/001768 dated Feb. 29, 2012, 3 pages.

International Preliminary Report on Patentability for International Patent Appln. No. PCT/US2011/001768 dated Oct. 2, 2012, 19 pages.

Written Opinion of the International Searching Authority for International Patent Appln. No. PCT/US2011/001768 dated Feb. 29, 2012, 7 pages.

NFPA 11 Standard for Low-, Medium-, and High-Expansion Foam; 2002 Edition; National Fire Protection Association (NFPA); Quincy, MA; pp. 148-150.

Wang Chunhua; "Fire-Fighting Design and Computing of Fixed Top Tank Foam Extinguishing System;" Safety, No. 2; Feb. 28, 2006; pp. 20-22. Reference discussed in English translation of the search report of Chinese Application No. 01180661170.5 dated Dec. 17, 2014.

Chen Guifeng; "Discussion of Design of Foam Extinguishing System with Low Multiplication Factor;" Light Metals, No. 9; Sep. 20, 2009; pp. 61-64. Reference discussed in English translation of the search report of Chinese Application No. 01180661170.5 dated Dec. 17, 2014.

Lang Xuqing et al., "Research on the Fire-fighting System of the Large Floating Roof Tanks;" Fire-Fighting System Design, vol. 28, No. 5; May 15, 2009; p. 342-345. Reference discussed in English translation of the search report of Chinese Application No. 01180661170.5 dated Dec. 17, 2014.

Mi Yixing et al., "Design of Foam Extinguishing System with Low Multiplication Factor;" Fire Technique and Products Information, Dec. 30, 1998; pp. 190-226. Reference discussed in English translation of the search report of Chinese Application No. 01180661170.5 dated Dec. 17, 2014.

First Office Action for Chinese Patent Application No. 01180661170.5 dated Dec. 17, 2014 with English Translation, 42 pages.

Search Report for Chinese Patent Application No. 01180661170.5 dated Dec. 17, 2014 with English Translation, 5 pages.

Henry Persson and Anders Lonnermark, SP Fire Technology 2004.

Akron Brass, "Single Shutoff Saberjet Nozzles", web page printouts from website www.akronbrass.com, 16 pages; printed on May 30, 2007.

Task Force Tips, "A Guide to Nozzles", 2001, 34 pages.

Williams Fire & Hazard Control, "Williams Product Catalogue", 29 pages, printed at least as early as May 10, 2010.

Rosenbauer, "RM 60E, The High-Performance Turret", web page printout from website www.rosenbauer.com, 1 page, printed at least as early as May 10, 2010.

National Foam, Inc., "Data Sheet #NDD180", product information brochure, 2 pages, printed at least as early as May 10, 2010.

Elkhart Brass, "Master Stream, R.A.N.™—Raid Attack Nozzle", web page printout from website www.elkhartbrass.com, 1 page, printed at least as early as May 10, 2010.

Non-Final Office Action for U.S. Appl. No. 12/451,687 dated Mar. 19, 2012; 7 pages.

(56) References Cited

OTHER PUBLICATIONS

Non-Final Office Action for U.S. Appl. No. 12/451,687 dated Jul. 2, 2012; 9 pages.
Final Office Action for U.S. Appl. No. 12/451,687 dated Nov. 28, 2012; 12 pages.
Non-Final Office Action for U.S. Appl. No. 12/451,687 dated Aug. 6, 2013; 9 page.
Non-Final Office Action for U.S. Appl. No. 12/451,687 dated Nov. 26, 2013; 8 pages.
Final Office Action for U.S. Appl. No. 12/451,687 dated Apr. 22, 2014; 11 pages.
Non-Final Office Action for U.S. Appl. No. 12/451,687 dated Aug. 7, 2014; 8 pages.
Final Office Action for U.S. Appl. No. 12/451,687 dated Nov. 28, 2014; 11 pages.
Non-Final Office Action for U.S. Appl. No. 12/451,687 dated Mar. 4, 2015; 9 pages.
Non-Final Office Action for U.S. Appl. No. 12/451,687 dated Jun. 24, 2015; 11 pages.
Final Office Action for U.S. Appl. No. 12/451,687 dated Oct. 26, 2015; 10 pages.
Restriction Requirement for U.S. Appl. No. 13/261,639 dated Aug. 27, 2015; 9 pages.
Non-Final Office Action for U.S. Appl. No. 13/261,639 dated Oct. 22, 2015; 18 pages.
Final Office Action for U.S. Appl. No. 13/261,639 dated Nov. 19, 2015; 22 pages.
Non-Final Office Action for U.S. Appl. No. 13/261,639 dated Aug. 2, 2016; 13 pages.
Final Office Action for U.S. Appl. No. 13/261,639 dated Apr. 14, 2017; 15 pages.
Non-Final Office Action for U.S. Appl. No. 13/261,639 dated Jan. 22, 2018; 13 pages.

* cited by examiner

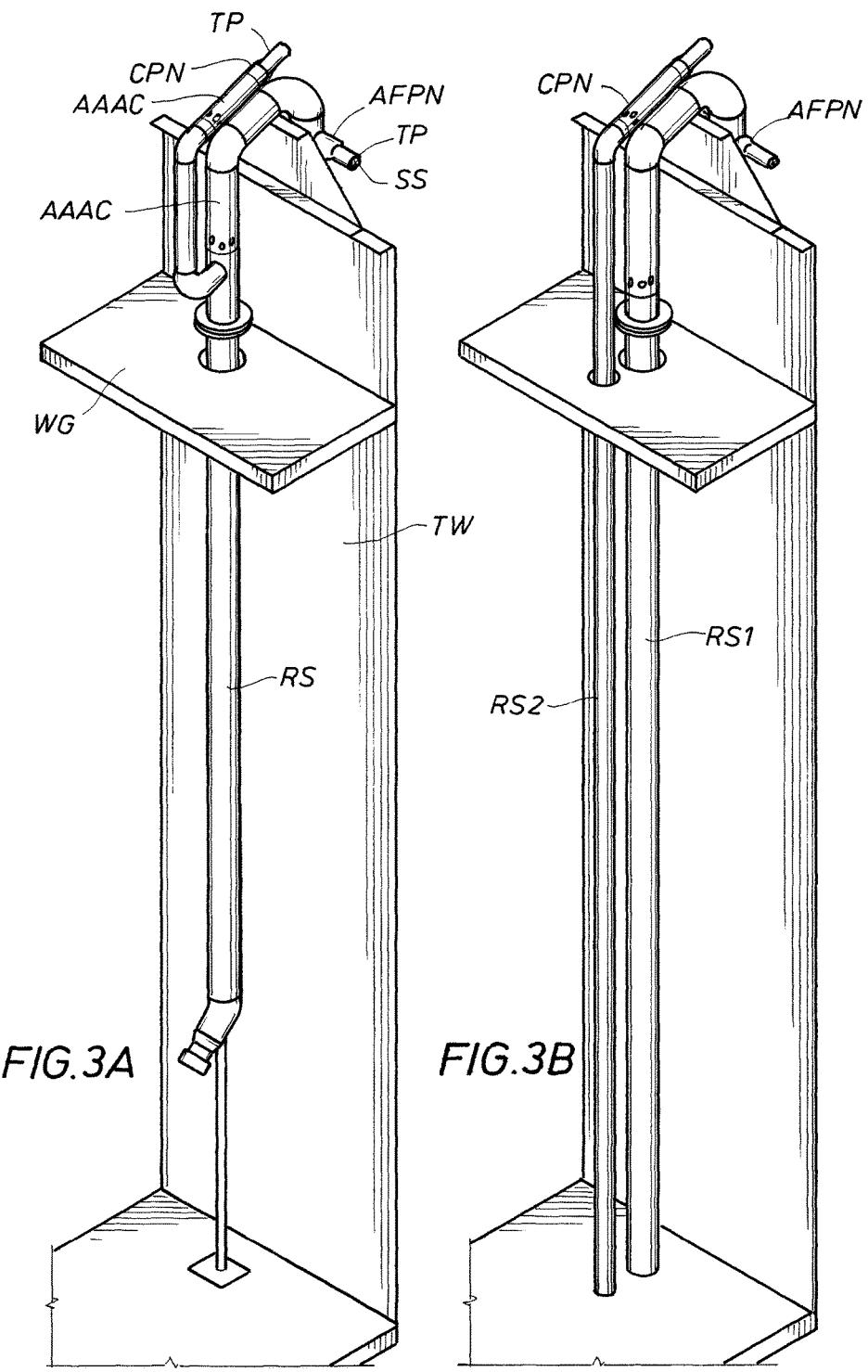

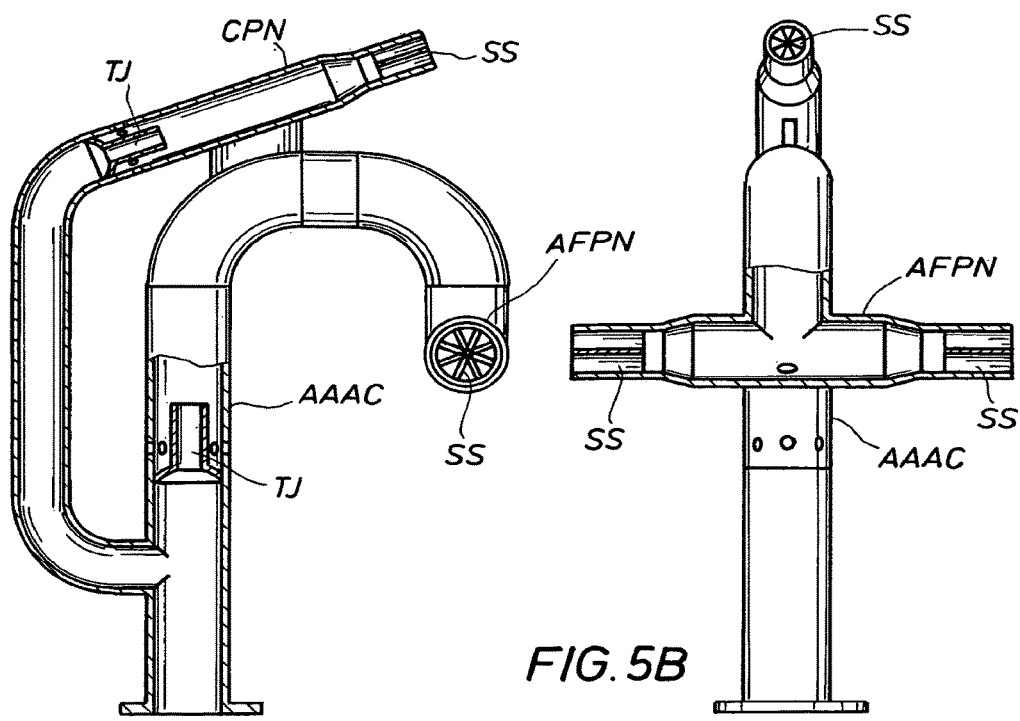
FIG. 5A
FIG. 5B
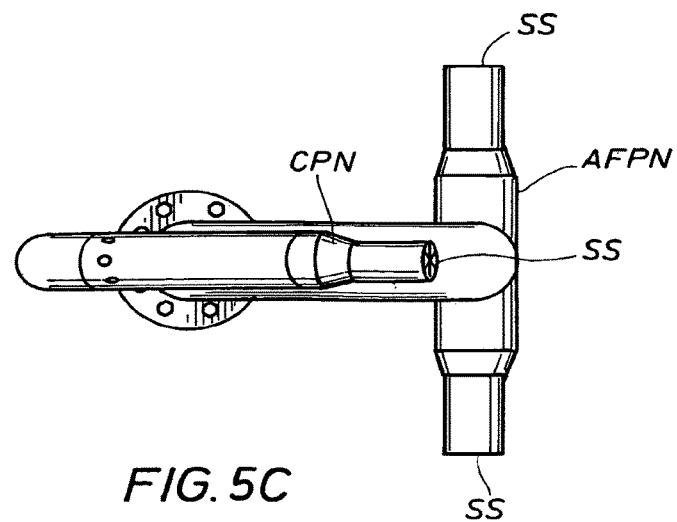
FIG. 5C

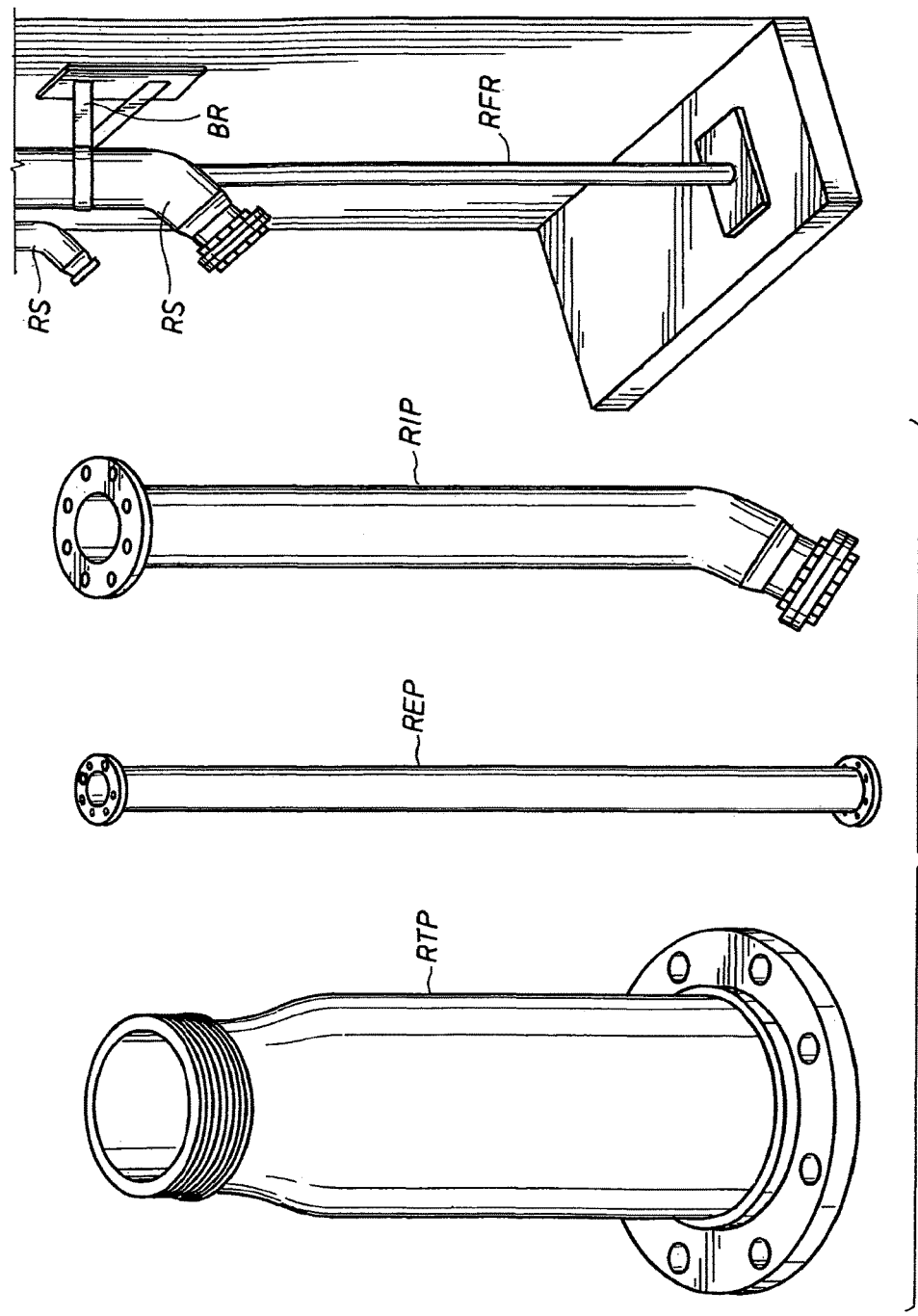

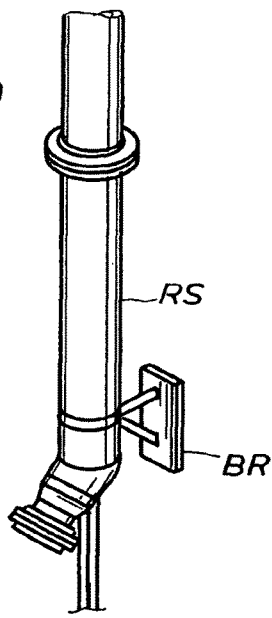
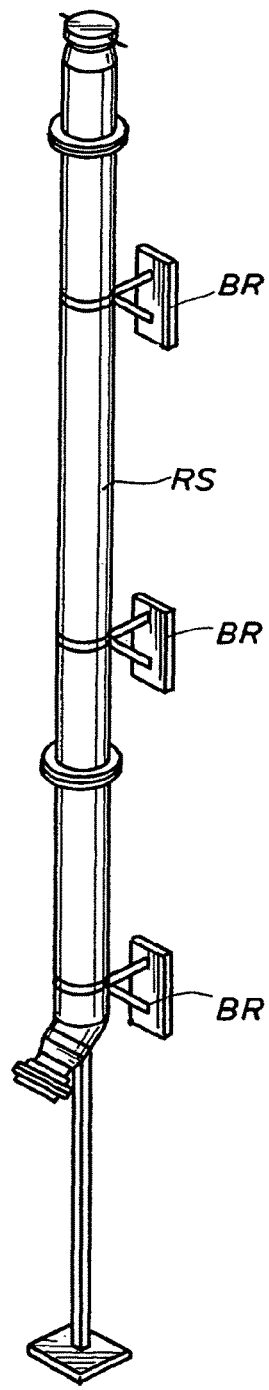
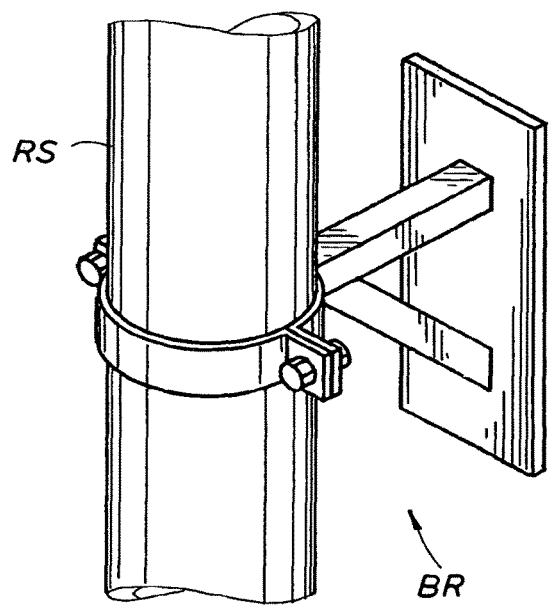

AMBUSH SYSTEM

| TANK SIZE | MODEL | FLOW BREAKDOWN ||||  TOTAL FLOW (GPM) |
|---|---|---|---|---|---|---|
| | | LEFT | RIGHT | UPPER | WALL | |
| UP TO 160' | AMBUSH 3305 | 300 | 300 | 0 | 50 | 650 |
| FROM 161' TO 230' | AMBUSH 4421 | 400 | 400 | 200 | 100 | 1100 |
| FROM 231' TO 310' | AMBUSH 5541 | 500 | 500 | 400 | 100 | 1500 |
| FROM 311' TO 360' | AMBUSH 6661 | 600 | 600 | 600 | 100 | 1900 |
| FROM 361' TO 410' | AMBUSH 6681 | 600 | 600 | 800 | 100 | 2100 |
| FROM 411' TO 500' | AMBUSH 8811 | 800 | 800 | 1000 | 100 | 2700 |

FIG. 9

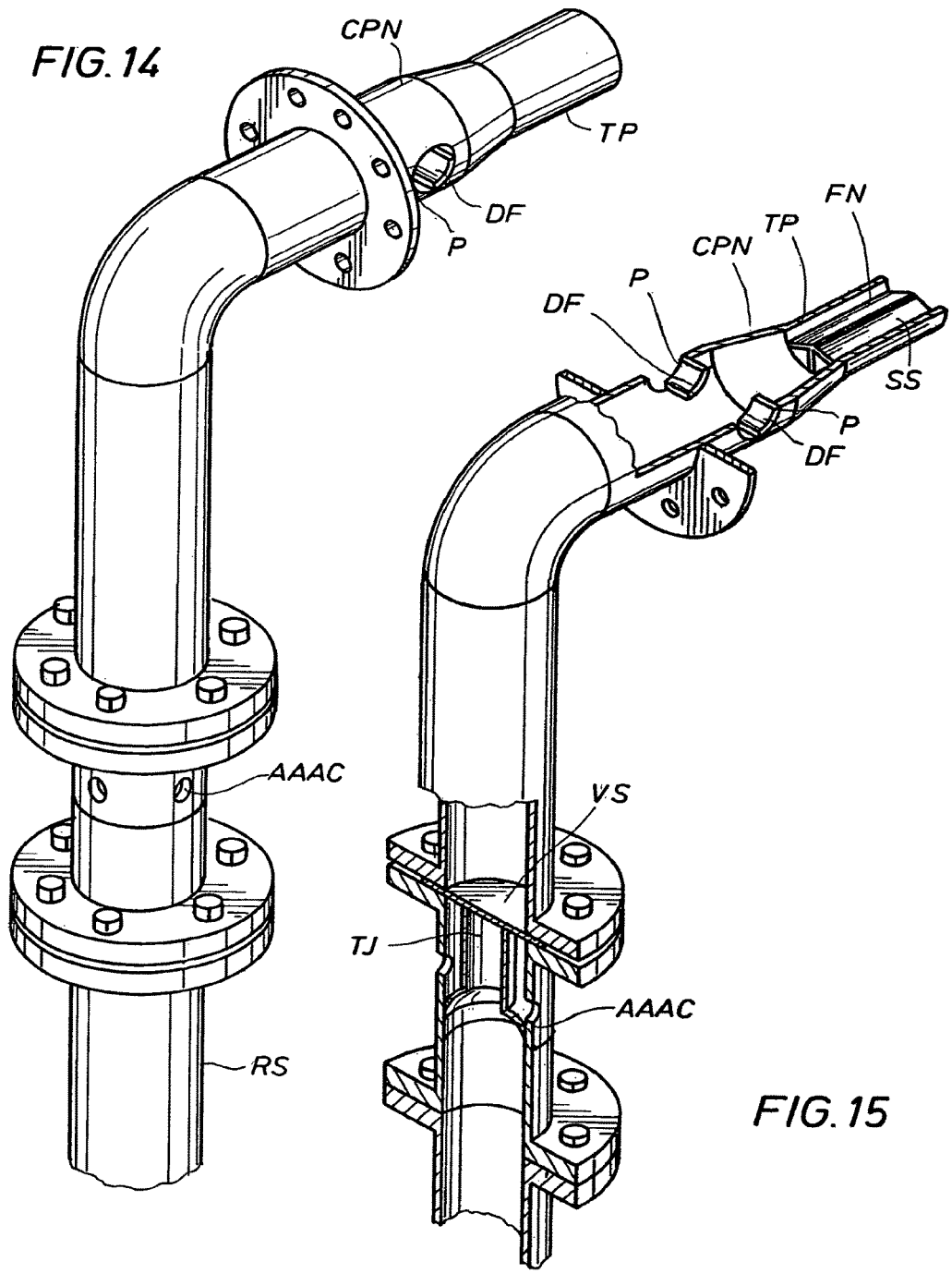

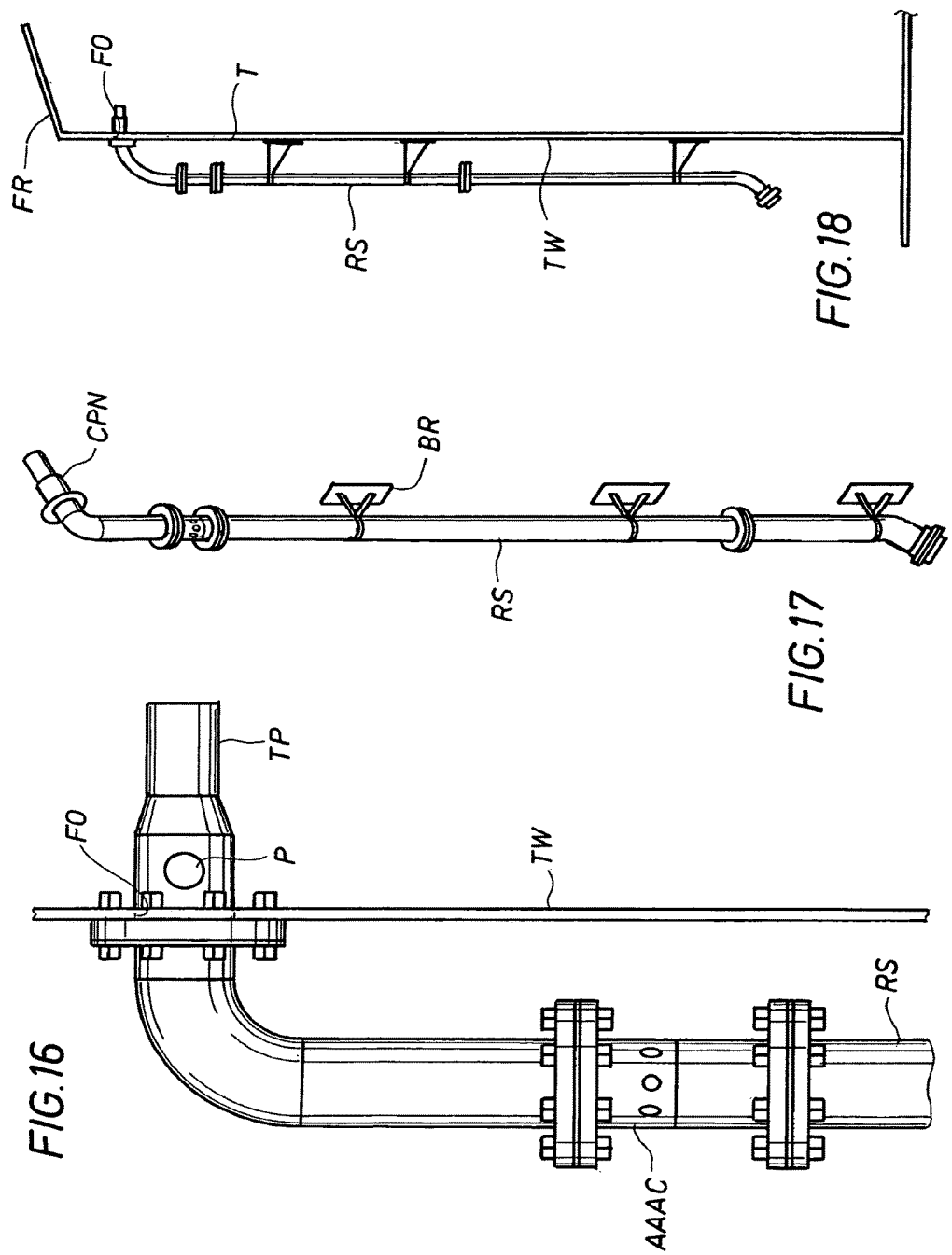

| NUMBER OF HOLLOW POINT SYSTEMS REQUIRED FOR FULL SURFACE PROTECTION OF CLOSED ROOF TANK ||
|---|---|
| 1000 GPM DISCHARGE FROM EACH SYSTEM ||
| TANK DIAMETER | DISCHARGE HEADS REQUIRED |
| 0' - 89' | 1 |
| 90' - 126' | 2 |
| 127' - 154' | 3 |
| 155' - 178' | 4 |
| 179' - 199' | 5 |
| 200' - 218' | 6 |
| 219' - 236' | 7 |
| 237' - 252' | 8 |
| 253' - 267' | 9 |
| 268' - 282' | 10 |
| 283' - 295' | 11 |
| 296' - 309' | 12 |

FIG. 20

FIXED SYSTEMS AND METHODS FOR EXTINGUISHING INDUSTRIAL TANK FIRES, WITH AND WITHOUT FIXED ROOF, INCLUDING AERATED FOAM PROJECTING NOZZLES AND CENTER DIRECTED NOZZLES

CROSS REFERENCE TO RELATED APPLICATIONS

This patent application is a divisional application of, and claims priority to, parent application U.S. Ser. No. 13/261,640, having the same inventors, of the same title, and filed Apr. 16, 2013, which parent application is a national stage of PCT application PCT/US11/01768 of same inventors and title, filed Oct. 17, 2011, which is a continuation-in-part of, and claims priority upon, four provisional applications by the same inventors: U.S. Ser. Nos. 61/455,367, 61/461,413, 61/463,296 and 61/519,071 filed Oct. 19, 2010, Jan. 18, 2011, Feb. 14, 2011 and May 16, 2011 and entitled "Rapid Tank Response, Equipment and Methodology;" "A Point and Shoot System (including as previously filed,) An Ambush System and Method and a Hollow Point System and Method, all for Fighting Industrial Tank Hazards;" "Further Developments—Fixed System (Point and Shoot, Ambush and Hollow Point)," and "Fixed/Semi-Fixed Aerated Foam Systems for Industrial Tank Hazards," respectively. The four applications are all herein and hereby incorporated by reference in their entirety to the extent permitted by law and regulation.

FIELD OF THE INVENTION

The field of invention includes fixed systems for fighting fire in industrial tanks including a wand with at least one laterally directed nozzle projecting aerated foam around interior tank wall portions plus a fixed centrally directed nozzle for projecting aerated foam. The invention also relates to a fixed system for fighting fire in large industrial tanks with a fixed roof.

BACKGROUND OF THE INVENTION

Industry Background

Williams Fire and Hazard Control, Inc. (Williams) has been a leader in the design, development, and production of specialty firefighting equipment and methodology for use on large industrial tank fires. A study published in a report by SP Fire Technology in 2004, written by Henry Persson and Anders Lonnermark, stated:

Despite the lack of large-scale tank fire tests in the last 15 to 20 years, significant improvements have been made regarding tank fire fighting using mobile equipment. The pioneers in this development have been Williams Fire & Hazard Control Inc. (WFHC) drawing attention to the need for solving the logistics during a fire and to use relevant tactics. By using large capacity monitors, large diameter hose and foam concentrate stored in bulk containers, the logistics become manageable. The use of large-scale monitors has also made it possible to achieve sufficiently high application rates in order to compensate for foam losses due to wind and thermal updraft. Williams have also introduced the "Footprint" technology where all the foam streams are aimed towards one single landing zone on the fuel surface, resulting in a very high local application rate making the foam spread more rapidly and efficiently. One of the main factors in achieving an efficient extinguishment, according to Williams, is the use of a high quality foam, suited for tank fire protection and until recently, they were primarily using 3M AFFF/ATC. Due to 3M's withdrawal from the foam business a similar foam type is now used, manufactured by Ansul. "Thunderstorm ATC." In 1983, Williams extinguished a 45.7 m (150 ft) diameter gasoline tank in Chalmette, La. ("Tenneco fire"), which at that time was the largest tank ever extinguished using mobile equipment. A new record was set in 2001 when an 82.4 m diameter (270 ft) gasoline tank was extinguished in Norco, La. ("Orion fire"). The concept for tank fire fighting used by Williams has been shown to be successful in many other fires [35] and the concept has also been successfully used by other companies, e.g. during the Sunoco fire in Canada 1996."

(Note: Thunderstorm™ foam concentrates are now developed and produced by Chemguard Inc.)

Historical Development

Historically, Williams has specialized in mobile equipment and methodology. "Fixed system" approaches to large tank fires, historically, have demonstrated limited success in the industry as well as high cost.

On the one hand, for "rim seal fires" (fire around the rim of a tank floating roof, around the roof seal) traditional fixed system approaches place a large number of "foam chambers" or "foam pourers" around the perimeter of the storage tank, every 40 feet or every 80 feet depending upon whether the "foam dam" on the floating roof is 12" or 24" high. These devices drop or "pour" highly aerated fire fighting foam down the tank wall into the tank "periphery," or area between the tank wall and the "foam dam" on the floating roof, by force of gravity. The cost for such system is high.

On the other hand, for "full surface liquid tank fires" in 100 foot plus diameter tanks, proven fixed systems have not existed. That is, to the inventor's best knowledge, no fixed system has put out a fully engaged full surface liquid tank fire in a 100 foot plus diameter tank.

Williams Fully Portable Systems

"Rim Seal Fire"

Before the "Daspit Tool," Williams successfully used fully portable devices and methods to extinguish "rim seal fires," using a two part attack. In the first phase of the Williams attack a fire fighter approached the tank and hung a portable device (foam wand with a non-reactive nozzle design) over the top edge of the tank proximate a platform or landing. The wand largely dispensed foam directly under the device, suppressing the fire in the immediate vicinity, over a 30 to 40 foot length. After a "beachhead" was established, a "beachhead" of 30 to 40 feet of tank rim with no flames under a landing, fire fighters mounted the tank wall using the ladder leading to the landing, and carried up handheld nozzles and hoses. (The gpm's of handheld nozzles are roughly limited to 60 gpm for a one person nozzle and a 125 gpm for a two person nozzle.) These nozzles were the primary fire extinguishing tools for the seal fire. Having gained access to the top of the tank wall through use of a foam wand, the fire fighters extinguished the "seal fire" by walking the "wind girder" around the tank wall, using the portable nozzles in a known manner.

Daspit Tool System

Subsequently, Williams developed a Daspit tool, a portable base for affixing a portable nozzle and monitor to the top of a tank rim or wall. With the Daspit tool, nozzles up to 2000 gpm could be attached to the top of a tank wall. Specifically again, on "a rim seal fire," with this improved technique, a portable foam wand device was again used to dispense foam downward to establish a "beachhead" area. A fire fighter then carried a Daspit Tool™, (being a clamping device used to secure a temporary fire fighting monitor and nozzle to the top edge of a storage tank, or any other approved mounting location) and hose while climbing the ladder and attached the Tool to the tank rim above the beachhead. The monitor and nozzle were then pressurized with water/foam solution and directed by the fire fighter stationed at the landing to dispense foam inside the tank and shoot out fire located around the tank's perimeter. The entire attack could be set up and executed in a matter of minutes, after, of course, the responding fire fighters had arrived at the scene.

Full Surface Fire

In September of 2004 Williams was called to Cushing, Oklahoma to assist in the extinguishment of a "full surface" 117 foot diameter crude tank fire. The Williams team arrived with portable foam wands and with "Daspit Tools," monitors and nozzles. (Again, "Daspit Tools" permit staging a monitor and nozzle on a tank wall rim. The "Daspit Tool" provides a base for a monitor and nozzle.) Williams first used portable foam wands to extinguish the fire around an area under a platform and ladder along the wall of the tank. Having gained "control" of that limited area, Williams personnel mounted the ladder of the burning tank to the platform, secured a Daspit Tool there and directed its monitor and nozzle to extinguish the full surface crude tank fire. Thus, Williams provided evidence that a portable foam wand and sufficiently large portable monitor and nozzle (rendered useable by virtue of the Daspit Tool base) could be effectively used to extinguish a "full surface tank fire", at least of crude in at least a 117 foot diameter tank.

Williams Fixed Systems Development

Williams had long appreciated that a "fixed" system, performing appropriate tasks, would be faster and offer much lower risk of harm and danger to personnel. (Danger to personnel includes the clutter on a ladder provided by the hoses necessary to supply a portable monitor and a wand. Furthermore, if such hose were to break while it runs up the ladder, the personnel involved with the ladder and platform would be put in significant danger.)

A problem to solve, and a goal for Williams in industrial tank fire fighting, became to develop a cost-effective, reliable, fixed system for quickly and efficiently blanketing appropriate areas of a tank fire with foam, including not only the "periphery," (which is the location of the "rim seal fire,") but also a tank "full surface fire." Such system, moreover, should perform satisfactorily for tanks of 200 and 300 and 400 feet diameter, and even greater, and include tanks with and/or without a fixed roof, and should not be prohibitively expensive.

The resulting Williams commercial embodiments, discussed below, were developed, tested and designed to solve these problems and meet these goals. The commercial embodiments were designed to protect: (1) floating roof only tanks against "rim seal fire" and vapor hazard; (2) floating roof only tanks against "rim seal fire" and full surface fire; and (3) fixed roof tanks against any surface hazard. The inventive systems are cost-effective and practical, for tank diameters from 100 feet to above 400 feet.

The instant inventors have demonstrated, in the development process, that the industry erred in certain prior assumptions regarding the proper expansion of foam needed for fixed systems, and regarding the capacity to throw or project and run an adequately expanded foam.

The instant inventors have demonstrated, with side by side testing, that "projecting" and "directionally discharging" an "aerated foam" (an expansion of between 2-to-1 and 8-to-1) from an aerated foam nozzle can produce a focused stream of at least 1100 gpm of aerated foam, with a significantly enhanced tight landing footprint, and with a surprising foam run, and including a surprising foam run speed and fire fighting effectiveness. The inventors have shown, with testing, that their aerated foam nozzles can reach a more extensive tank fire surface in a shorter period of time than can prior art "foam chambers." The novel system can extinguish larger tanks with fewer units and is applicable not only to rim seal fires but also to full surface liquid tank fires, including of those of large tanks. The instant inventions, supported by test results, promise cost effective fixed systems to extinguish fires in tanks of diameters greater than 200 feet, greater than 300 feet, and greater than 400 feet. The instant fixed systems are designed to be attached along the tank outer wall, and to discharge into the tank from a point near a top tank wall portion, thereby enhancing the reliability as well as the cost effectiveness of the fixed system, in the event of a hazard.

Invention Development Stages

The instant invention proceeded in several stages. A first determination was made, based on experience and testing, to actively pursue outer tank wall mounted units discharging proximate the tank wall upper rim. (The inventors have experimented with "bubble-up" or so-called Type I systems but have not yet been able to successfully test a satisfactory, practical and cost effective bubble-up system. Pipe-inside-the-tank systems, based on extensive experience, were deemed impractical given the prevalence of floating roofs and the complications inherent therein. In regard to roof mounted systems, either fixed roof or floating roof or systems that "extend-over" the top of the liquid, experience again indicated far too high a likelihood that such a fixed system would be placed out of service by the very incident that causes the fire or hazard.)

A second determination, based on testing, was to preferably discharge aerated foam from an aeration chamber proximate to and upstream of the nozzle, the aerated foam preferably having at least a 2-to-1 to 8-to-1 expansion ratio. A 3-to-1 to 5-to-1 ratio was preferred. A tubular jet ambient air aeration chamber provided a reliable structure for the aeration, able to perform while enduring heat and stress. It was determined by testing that this aerated foam could be significantly projected, could produce a significant foam run, and could run quickly without losing fire fighting effectiveness.

Thirdly, the inventors created a nozzle that could significantly, directionally, "project" and/or "forcefully project" a proper aerated foam in a "substantially focused stream," to land in a focused pattern, with an enhanced tight landing footprint, and again with significant foam run and effective fire extinguishment characteristics. A key to this stage was a stream shaper.

One general belief in the industry had been that "forcefully projecting" aerated foam destroyed the bubbles and resulted in poor foam quality and poor foam run. Prior art fixed systems with aerated foam chambers did not "forcefully project" aerated foam. Rather, for rim seal fires and/or small tanks, they poured or dropped by gravity highly aspirated foam down the inside walls of the tank. This resulted in a low gpm of discharge and a poor foam run.

The instant inventors demonstrated that, with the instant nozzles, the expectation of poor bubble quality and poor foam run for "projected" or "forcefully projected" aerated foam was misplaced. Use of a stream shaper may be instrumental in helping to secure the good results and enhanced landing footprint.

Testing has shown that a stream shaper can significantly enhance the integrity and focus of thrown footprints of aerated foam. Aerated foam discharged through a proper stream shaper has non-destructively landed at least dozens of feet away, in tightly focused footprints, and run surprisingly further and quicker than industry predictions, while maintaining the fire fighting effectiveness of the bubbles. A 2-to-1 to 8-to-1 expanded foam, preferably a 3-to-1 to 5-to-1 expanded foam, can be non-destructively landed in tight target areas to a greater extent and further away than industry expectations. The stream shaper is one key why the instant system can land foam at least 20 feet away in a tank "periphery" and run the foam greater than 100 feet further in the periphery. In preferred embodiments a footprint-enhancing stream shaper for an aerated foam nozzle has four or greater fins, each fin having a longitudinal dimension greater than a radial dimension. Preferably each fin has a longitudinal dimension greater than twice its radial dimension. Preferably also the stream shaper fins are installed in a tip of a nozzle such that the downstream end of the fins is approximately flush with the nozzle tip discharge orifice.

Terms

The following use of terms is helpful in discussing the structure and performance of the instant inventions as they developed.

The term "riser" is used to refer to any pipe or line or system of such, affixed to or near or adjacent to an outer tank wall, installed to provide water, water and foam concentrate and/or fire fighting fluid to a top portion of a large industrial storage tank. Although risers are shown herein as vertical pipes, they could be any shape, and in particular, they could be a combination of vertical and/or circular portions. E.g. one or more fluid distribution rings could be installed around a tank, connecting with vertical riser portions. A riser can come in sections, as illustrated herein.

A "tip" of a nozzle is a nozzle barrel portion terminating in a discharge orifice, frequently including a swedge-down portion to enhance discharge pressure.

A "fin" (also referred to in the art as a vane) directs fluid flow in a conduit.

A "stream shaper" provides fins or vanes extending in a nozzle or conduit. A fin radial dimension is the dimension measured radially from a center axis of a barrel or conduit out toward the barrel or conduit wall. A fin longitudinal dimension is the dimension of the fin measured longitudinally in a nozzle or conduit, along a nozzle or conduit longitudinal axis or in the upstream/downstream direction of flow.

A "deflector," as used herein, provides an obstruction in a fluid conduit, directing a portion of fluid flowing therein toward a discharge orifice or port.

A tank "periphery" is an annular area on an top of a floating tank roof, between the tank wall and the floating roof "foam dam." Foam dams are usually 24 inches high or 12 inches high. A "rim seal fire" is a fire in the "periphery." (A full surface fire can ensue when a floating roof fails, e.g. sinks or tilts.)

An "aerated foam nozzle" or an "aerated foam projecting nozzle" will be used to indicate a nozzle that discharges foam created from a foaming concentrate that has passed through an ambient air aeration chamber located at, proximate to, and/or just prior to, a nozzle.

Two nozzles discharging "in roughly opposing directions" will be used to mean discharging in roughly opposite directions, within at least +/−15° of a median "directly opposite" directional axis. By one measure, thus, the included angle between two discharge axes of two nozzles discharging in roughly opposing directions, taken in the direction of discharge, will be between 180° and 150°.

A "substantially focused" stream indicates a discharge of foam where at least 60% of the foam remains within a 20 degree cone around a discharge axis during flight.

A "projecting" nozzle means a nozzle that, if set at 0° inclination to the horizon and at a supply pressure of 100 psi, and if a landing footprint is measured on a horizontal plane five feet below the discharge orifice, and when throwing aerated foam with an expansion of between 3/1 and 5/1, then the nozzle can land at least 50% of the aerated foam greater than 5 feet from the discharge orifice and can land some foam greater than 20 feet. "Projecting" thus means landing at least 50% of foam, aerated with an expansion of between 3-to-1 to 5-to-1, greater than 5 feet from the nozzle discharge orifice and landing significant foam greater than 20 feet, if discharged horizontally and measured on a plane five feet below the discharge orifice.

A "forcefully projecting" nozzle means a nozzle that, if set at 0° inclination to the horizon and at a supply pressure of 100 psi, and if a landing footprint is measured on a horizontal plane five feet below the discharge orifice, and when throwing aerated foam with an expansion of between 3/1 and 5/1, then the nozzle can land at least 50% of the aerated foam greater than 50 feet from the discharge orifice and can land some foam greater than 80 feet. "Forcefully projecting" thus means landing at least 50% of foam, aerated with an expansion of between 3-to-1 to 5-to-1, greater than 50 feet from the discharge orifice and landing some foam greater than 80 feet, if discharged horizontally and with a landing footprint measured on a horizontal plane 5 feet below the discharge orifice.

The concepts of "substantially focused" stream and "projecting" and "forcefully projecting" together with "aerated foam nozzle" help distinguish the instant inventive nozzle and wand systems from aspirated foam discharge devices of the prior art. Prior art discharges from traditional "foam chambers" or "foam pourers" are not "substantially focused" or "projecting." On the other hand, the term "aerated foam nozzle" distinguishes the instant nozzles from master stream nozzles of the prior art, for instance, nozzles that throw a water/foam concentrate liquid mixture where essentially all aeration takes place significantly after leaving the nozzle structure rather than in an associated upstream or in-nozzle aeration chamber.

Given the surprisingly good foam run results with the instant nozzle design and aerated foam, the inventors tested "opposing nozzle" fixed units, referred to by the inventors as "wand heads" and "wands." "Two nozzle" and "three nozzle" fixed units, or "wand heads" or "wands," were tested, discharging roughly horizontally and primarily left and/or right, and optionally, "toward the center." For insertion through existing openings in a wall of a "fixed roof" tank, a conduit with a single center pointing nozzle plus dual non-obtrusive side ports with interior deflectors was tested, the unit suitable for inserting into existing fixed roof tank wall flanged openings.

The "wand heads" are adapted to be supplied by "risers," mounted on, proximate to or about outside tank wall portions, the "wand heads" to be secured so as to discharge just inside a top tank wall portion, for enhanced reliability. The "wand heads" preferably include a proximally located ambient air aeration chamber providing properly aerated foam for the nozzle(s). The aeration chambers are served by water/foam concentrate line(s) or pipe(s), again typically referred to as "risers." A fixed wand head with two opposing nozzles preferably directs discharges roughly left and right, projecting aerated foam substantially horizontally and in roughly opposing directions. A fixed separate riser and fitting can be provided, especially proximate a tank ladder and landing platform, to supply and support an additional fixed nozzle or portable monitor and nozzle, which can project foam toward the center of the tank or otherwise around the tank. Preferably a "three nozzle" fixed unit for open floating roof tanks can be installed to discharge left, right and roughly toward the center. For fixed roof tanks, a single center pointing nozzle with two conduit-located deflection ports can be installed, the ports functioning as side nozzles. The unit can be inserted through flanged openings typically provided in existing fixed roof tanks. The single conduit nozzle plus two "deflector ports" can discharge left, right and toward the center of a tank with a fixed roof.

(The inventors further teach, for alcohol or the like liquids, possibly not discharging both left and right but alternately discharging all left or all right, to establish a swirl pattern run, and to further bank the discharge against the wall to minimize plunge.)

(Preferably in most embodiments a fourth smaller orifice will discharge a relatively small amount of aerated foam, say less than 150 gpm, directly down the tank wall to land and cover tank surface directly under the unit. Frequently this small fourth discharge port may not be mentioned herein, and in many cases it appears unnecessary. However, it will likely be included in commercial units out of caution.)

The instant system thus offers a cost effective solution to a costly and dangerous problem. Providing first responding fire fighters with a proper means for successful extinguishment of at least tank rim seal fires, and preferably also means for full surface vapor suppression and means for extinguishing full surface liquid tank fires, by strategically and permanently fixing a relatively few inexpensive components onto a tank, as well as providing supporting tools (monitors, nozzles, hose, and pumps,) should be paramount in considering how to best protect a hazard. Doing so ensures a good relationship with the first responders as well as provides a better solution to large tank hazards.

To recap and reflect on the development history, a Williams two stage "fully portable" attack for "rim seal fires," and even for "full surface liquid tank fires," has been successful. However, as required by the two stage "fully portable" attack, requiring humans to carry hoses up a tank ladder to the tank landing, and to charge the hoses around their feet in order to activate a primary system, presented a personnel risk that was not attractive. Unmanned or largely unmanned fixed systems presented a far more attractive personnel environment. However, any fixed or semi-fixed system must also approach the degree of reliability and flexibility and cost effectiveness as that provided by the two stage "portable" system.

A surprising discovery, that heightened the reliability, cost effectiveness and flexibility of the instant fixed systems, came with the testing of a landing footprint-enhanced, "aerated" foam nozzle "projecting" aerated foam. The aerated foam nozzle, with tight landing footprint-enhancement, tested to show that it could "throw" aerated foam significantly left and/or right while still landing a predominant portion of that foam in the narrow tank "periphery." Further, the nozzle could throw or project aerated foam successfully for a significant distance, e.g. at least 20 feet, while landing the foam predominately in the periphery. And the momentum of the "throwing" or the projecting enabled the system to "run" foam, tests showed, a surprising distance, 120 feet both left and right of the nozzle, and to do so very quickly. As a result, a footprint-enhanced aerated foam nozzle could form a suitable cost effective primary fixed means for at least extinguishing rim seal fires. To compare with the Williams prior "portable system," the prior portable foam wand was only used to establish a "beachhead" directly below the wand, which allowed humans to mount the tank wall at the wand position by the ladder and to put into place the primary fire extinguishing system, fed by hoses running up the ladder. To the contrary, with the instant novel fixed systems, a portable monitor and nozzle, if used, becomes secondary. A "fixed left and/or right wand" becomes the key element of the primary fire extinguishing system for the "rim seal fire." A further fixed center pointing nozzle covers a full surface fire.

Discussion of Other Discovered Teachings

The problem of an effective practical reliable design for a fixed fire extinguishing system for tank fires, especially in tanks of diameter of greater than 100 feet and 200 feet, has existed for a long time. Search into existing solutions uncovered the following.

Foam Chambers—for Example, Blomquist U.S. Pat. No. 3,876,010

For floating roof seal fires, "foam chambers" or "foam pourers," discussed above; dropping highly aspirated foam between a tank wall and a floater roof "foam dam" have been a traditional fixed fire fighting system solution. These systems are inadequate to attack a "full surface" fire in a >200 foot diameter tank and likely inadequate for > a 100 foot diameter tank. Their foam run is typically less than 50 feet, so that a large number of such chambers are required. Given the degree of expansion imparted to the foam, the foam run is slow and short and the gpm is limited. Applicant experimented with the common foam chambers to confirm that the run of their highly aspirated foam was only about 40-50 feet in each direction around the tank perimeter or periphery (e.g. in the area between tank wall and the "foam dam" on the floating roof.) And this 40-50 foot run was also relatively slow.

Saval and Knowsley

A "Saval" apparatus was noticed on the Internet and a similar Knowsley apparatus discovered. This apparatus type proposes two 45° down pointing nozzles, "discharging" left and right, stationed along the wall rim, (as well as a small directly downward discharge). The two 45° nozzles do not discharge "significantly horizontally" and no nozzle is proposed to discharge "toward the center" of the tank. Further Saval's nozzles appear to "bank" their discharges against the tank wall. The effect of banking could be to soften the impact of landing on the liquid and/or to direct more of the foam into the periphery and/or to heighten the aeration. However, one of skill in the art knows that the "banking" technique lessens the lateral force behind the foam, wastes projection energy and reduces foam run capability. Neither Saval nor Knowsley claim a novel or exceptional "foam run" capability. This implies that Saval's and Knowsley's foam run is in the same order as that of the traditional "foam chambers" and/or "foam pourers."

Uribe US Patent Publication No. US 2004/0140106

Uribe teaches a tank wall mounted fixed system nozzle with an aeration chamber. The degree of aeration is not mentioned. No stream shaper is disclosed. Uribe does not discharge right or left, but only toward the center, as with the Nihilator below. Uribe asserts that eventually his discharged foam will cover a whole tank surface. Since one of ordinary skill in the art knows that foam has a limited lifetime and a limited run, Uribe's statement implies that Uribe's tank is inherently of less diameter than 100 feet.

Nihilator

Reference to a Nihilator device was located, although the Nihilator appears to be no longer offered as a commercial product. One of ordinary skill might surmise that the Nihilator was not effective. The Nihilator is a center pointing nozzle apparently designed for a fixed roof tank and has an aeration chamber. The Nihilator discharges foam toward the center of the tank and suggests that it be used with traditional foam chambers.

Major Commercial Embodiments

The instant invention and its related embodiments have several major commercial embodiments. For ease of reference, the current major commercial embodiments are given graphic names.

Primary Target—Floating Roof but No Fixed Roof—Large Tanks

"Point and Shoot" (semi-fixed) System—Useful for:
  Rim seal protection and fire fighting
  Full surface foam blanket when no fire exists, e.g. for sunken roof vapor suppression Advantages Each wand can protect up to 240' of seal rim circumference, as opposed to 40' or 80' with conventional foam chambers; therefore fewer wands are needed
Portable monitor and nozzle provides back-up redundancy and vapor suppression capability
Low costs, minimal installation
"Ambush" (fixed) System—Useful For:
  Full surface protection, rim seal fire and fully engaged full surface liquid tank fire (floating roof sunk)
  Number of systems per tank depends on tank diameter (and product stored)
  System can be used to extinguish rim seal rim fires with center nozzle valved off so as not to overload a floating roof Advantages Left/right/center (and possibly down-the-wall) streams can discharge and/or project aerated foam in 3 or 4 directions
System capable of discharging 1900 gpm from each assembly on the largest model
Each wand can protect up to 240' of seal rim and up to 150' toward the center
Requires significantly fewer wand installations than prior art Primary Target—Fixed Roof, Large Tank "Hollow Point" (fixed) System—Useful for:
  Closed roof, full tank protection Advantages Easy installation on existing tanks, through existing single 6" flanged holes.
Each wand can protect up to 240' of seal rim and up to 250' toward the center
Incorporates a Teflon vapor seal to stop vapors from traveling down the tube and out aeration holes
Can project 2700 gpm of foam total, via forward and left/right and down streams
Requires significantly fewer wand installations than prior art Again, success of the above embodiments may be based in part upon the development of a stream shaper affixed in the tip of the nozzles, which facilitates providing a projecting and forcefully projecting foam nozzle, as well as developing a properly aerated foam for the context.

The Major Commercial Systems and Methodologies—in Greater Detail

The invention, as introduced and discussed above, relates to various aspects and embodiments for fixed and semi-fixed systems and methods for extinguishing liquid tank fires in large industrial storage tanks. The invention covers tanks with and without fixed roofs and systems that are fixed or semi-fixed, and systems developed primarily for rim seal fires and for full surface liquid tank fires.

The Semi-Fixed System (for Rim Seal Fire and Vapor Protection)—Point and Shoot, Summarized The Point and Shoot fixed wand and riser system is a semi-fixed system that can be used immediately for "rim seal fire" protection as well as for vapor suppression. The Point and Shoot fixed wand and riser system is predicated upon the successful rim-seal extinguishments made by Williams using fully portable equipment, as well as the subsequent Daspit Tool development. Given the further development of a proper aeration chamber and a stream shaped nozzle combination, aerated foam nozzle units, or "wands," fixed to the wall of the tank become a cost-effective primary "rim seal fire" extinguishing means. A further fixed riser, for supplying fire fighting fluid to a portable monitor and nozzle, can provide redundancy in case of damage to the primary system as well as extra full surface vapor suppression capability. (And of course, further independent fixed risers with fixed center pointing nozzles offer a fully fixed full surface fire protection capability.)

Thus, the semi-fixed Point and Shoot wand and riser system and method provides safer and quicker extinguishment for rim seal fires, as well as a back-up for component disablement or vapor suppression. This minimal fixed wand and riser system requires only strategically permanently affixing a few inexpensive components directly onto a tank. As a consequence of a proper combination of a footprint-enhanced nozzle with a properly aerated foam, the left and right nozzles of a wand can be fixed 220 to 240 feet apart, (as opposed to 40 to 80 feet apart with prior art foam chamber systems.) Thus, the footprint enhanced aerated foam nozzle wand system can be staged as a primary fire extinguishing system for the "rim seal fire" while one or more risers, installed proximate a tank landing and ladder for the quick attachment of portable monitor/nozzles, can be regarded as redundant backup rim seal fire protection, in case of damage to the primary system, and as a capability to provide full surface vapor suppression if a floating roof partially or totally sinks. This semi-fixed system permits attacking a seal fire quickly with much less risk to personnel.

The semi-fixed elementary system, called the Point and Shoot System, has a recommended layout as follows:

Number of Foam Wands for Full Encirclement Seal Protection
240' Coverage From Each - 24" Tall Foam Dam Required
at least 220' coverage from each - 12" tall foam dam

| Tank Diameter | No. of Foam Wands Required |
|---|---|
| 0'-76' | 1 |
| 77'-153' | 2 |
| 154'-229' | 3 |
| 230'-306' | 4 |
| 307'-382' | 5 |
| 383'-458' | 6 |

Williams Fire and Hazard Control 1-800-231-4613
Note:
The number of prior art "foam chambers" which would be required to protect the above tank sizes is many multiples of the number of the instant novel "foam wands" required, due to the extended coverage of the instant "foam wands" (240' vs. 80' or 220' vs. 80').

The Point and Shoot semi-fixed system is particularly applicable for large tanks with no fixed roof for "rim seal fires" and full surface vapor suppression. A major advantage is low cost. The Point and Shoot system is characterized by a pair of aerated foam projecting nozzles attached together in a fixed "wand," structured to discharge in roughly opposing directions and roughly horizontally. The aerated foam tank wand has been demonstrated to be able to land and run foam approximately 120 feet in each direction in the tank "periphery," that is the space between the "foam dam" and the tank wall of a floating roof. See below test results. Preferably in addition to the fixed foam wands risers attached to or about the tank wall, at least one additional at least four inch riser is attached to the tank wall to be associated with the tank landing ladder system. The additional riser is structured to communicate fire fighting fluid from approximately the ground to approximately the top of the tank and is structured with a fitting at its end, proximate the top of the tank, the fitting suitable for attaching a portable (at least 150 gpm at 100 psi) monitor and nozzle.

The Fixed System for Floating, not Fixed, Roof—Including Full Surface Fire—Ambush Summarized One new primary danger arises from the fact that industrial storage tanks for storing flammable liquids and hydrocarbon products are being constructed of ever greater diameters. Today 405' diameter tanks, and greater, are being constructed. Large scale portable fire fighting nozzles, such as 10,000 gpm, 12,000 gpm or 14,000 gpm nozzles, capable of throwing fire extinguishing and hazard suppressing liquids (water and foam concentrate) over the top of the tank wall typically recite maximum ranges in the 400-500 foot range. Fire fighting foams from the large scale portable nozzles can be relied on to run, at best, approximately 100'. (Conservatively, the foam might only be reliably counted upon to run about 80 feet.) Thus, portable fire fighting nozzles effectively addressing a full surface, fully engaged flammable liquid tank fire in a 405' diameter tank by throwing foam over the wall from an upwind location probably have to be staged within 100' of a tank wall. Considerations of logistics as well as the existence of moats, buildings and other equipment and piping around the tanks, and especially considerations of heat and personnel safety, render extremely problematical any tactic requiring approaching a fully engaged full surface liquid tank fire in a 405' diameter tank closer than 100'.

Further pressure for improvement comes from the fact that the value, to the tank owner, of a gallon of the product in the tank is also increasing dramatically. Owners of large tanks and of large tank products want the product and the tank to be protected from fire.

The above considerations incentivized the inventors to develop a fully fixed system, including one or more fixed center pointing nozzles plus an aerated foam wand, preferably a left and right discharging wand but possibly an all left or all right discharging wand. The system is known as the Ambush and provides a first defense for addressing fire and vapor hazards, including full surface liquid tank fires, in all tanks without a fixed roof, but especially in large diameter tanks.

The Ambush could be implemented in one fashion as a "fixed" Point and Shoot System. The Point and Shoot riser provided with a fitting for attaching a portable monitor and nozzle, located near the tank ladder and landing, could be provided instead with a permanently fixed center pointing nozzle, such as a master stream self-educting nozzle. The riser and nozzle could look and function much like the Hollow Point riser and nozzle, without however the lateral space constraints, the side ports and without the necessity of an aeration chamber. The adjustment of the nozzle could be fixed or set with respect to the tank size and other fixed wands such that the nozzle covers a relevant center portion of the tank surface with foam. No separate ambient air aeration chamber would be required, as known in the master stream fire fighting nozzle field. A separate fixed riser and nozzle need not be limited to being located near a tank ladder and landing. Only so many fixed center directed riser and nozzles need be included as will adequately cover the center portion of the tank surface with foam, in context.

An Ambush System provides a tailored design of three nozzle units, or wands, preferably with all nozzles using one or two proximate ambient air aeration chambers and all working off of one or two associated risers. These three nozzle units are designed to be installed as units around a tank.

The three nozzle, fixed, aerated foam wand system includes a set of fixed aerated foam nozzles. This set of nozzles, each referred to as a fixed "wand," has left and/or right and over the top (toward the center) capability, all with enhanced landing footprints. Preferably the units of three nozzle wands are spaced around, and proximate to, the inner tank wall, each unit preferably providing two nozzles that discharge predominantly left and right, along inner tank wall portions, and a third nozzle that discharges toward the center. Preferably the "toward the center" nozzle discharges at least beyond an approximate 80' annular ring of foam, anticipated to be created upon an open tank surface by the left and right discharging nozzles. (In some cases the three nozzle wand unit also provides a fourth small port or nozzle to discharge directly beneath the wand and on the inside of the tank wall.) Any disablement of a fixed wand due to a particular fire or hazard or incident can be supplemented by large portable nozzles staged on the ground, throwing foam over the tank wall, as is known in the art.

The perimeter of a 405' tank runs approximately 1,250 feet. Testing shows that the instant novel fixed foam wands (Ambush System) should be able to direct foam to run at least 80' to 90' in each direction, preferably 120 feet, and to also run the foam 80' or so inward toward the center of the tank. (Again, in addition, a small amount of foam may be discharged directly below the fixed foam wands.) These nozzles could cover the inner tank wall with a roughly 80' wide annular foam ring, relatively quickly. A third nozzle attached to each fixed wand, preferably with its own aeration chamber, projects foam toward the center of the tank and at least toward the inside of the 80' annular foam ring being established. Preferably, for a large tank, the third nozzle lands a footprint of foam with a footprint midpoint approximately 90 to 120 feet radially inward of the tank wall. The length of the landing footprint should preferably extend at least 20 to 30 feet forward and backward from the landing midpoint, along the discharge projection line. The landing footprint should preferably spread at least 15 to 20 feet laterally from the discharge projection line. Such a discharge of foam has been shown to be capable of running foam toward and through the center of a 405' diameter tank. Taking the center projected foam together with the peripherally discharged foam, a total gpm of foam should be selected such that the surface of the tank would be covered with an adequately deep and lasting foam blanket. That is, the gpm of the wands and nozzles should take into account the desired and/or required application rate density for the tank surface.

This fixed three nozzle open system and methodology has an advantage of concentrating a foam blanket on portions of the tank liquid surface adjacent to the tank walls. The portions adjacent to the tank walls are important because the tank wall itself can retain significant heat. The tank wall typically needs the most cooling. For a 405 foot diameter tank, for instance, seven or eight large three nozzle fixed foam wands might be utilized, each large three nozzle foam wand discharging approximately 2,000 gpm of water/foam concentrate total from its nozzle cluster. In a preferred embodiment a nozzle discharging to the left and to the right might discharge approximately 700 gpm each. A nozzle directed toward the center might project approximately 500-900 gpm toward the center. A small port discharging immediately under the fixed wand might discharge approximately 100 gpm downward.

Again, to the extent that one or more fixed foam three nozzle wands are disabled by the fire or an explosion, large portable fire fighting nozzles can be staged on the ground and used to supplement the non-disabled portions of the fixed system.

In the three nozzle fixed aerated foam wand system the discharge orifices for the nozzles preferably contain fins, or stream shapers, to minimize the turbulence in the discharge of aerated foam out of the nozzles. Minimizing turbulence enhances the range and the run of the foam, and tightens the landing footprint.

One preferred three nozzle fixed aerated foam wand embodiment includes two aeration chambers. The aeration chamber(s) typically consist of tubular jets inserted inside of piping proximate a series of air intake ports, and the chamber is situated proximately upstream of the nozzle discharges. The jets, in a known manner, create a low pressure zone, sucking air in through the ports and mixing the water/foam concentrate with air to create an aerated foam for discharge. Bends incorporated in the conduit between an aeration chamber and a discharging nozzle may enhance the aeration of the foam. No bend may be included between an aeration chamber and a center projecting nozzle, however, to minimally aerate that foam in order to enhance foam throw and run. Discharge from that nozzle has a longer flight time in which to further aerate. Two aeration chambers enable tailoring the aeration more closely to the nozzle purpose.

Although the three nozzle system was initially designed to address the problem of a very large, fully engaged, full surface liquid tank fire (no fixed roof), such as a fire in an industrial tank having a diameter of 405 feet, the fixed three nozzles aerated foam wand system was quickly seen to have application to tanks of all diameter sizes, and in the situation of either a fully engaged fire or a rim seal fire or simply a need for vapor suppression. The large fixed wand is useful even if a floater remains in place and there is only a seal fire or a need for vapor suppression over the floater. A valve can be provided to eliminate foam discharged toward the center in the case of a rim seal fire.

Fixed Roof Fixed Nozzle System—Hollow Point Summarized

A fixed roof fixed nozzle wand system has been designed as a direct response to the issues faced by foam chambers when installed on a closed roof tank for the purpose of full surface protection. One wand of the instant fixed roof fixed nozzle system projects foam directly toward the center of the tank as well as left and right to protect near the inner tank walls. The wand unit preferably incorporates a Teflon vapor seal to prevent tank vapors from escaping the tank via the aeration holes in the wand system's supply piping.

In contrast with foam chambers that simply pour foam onto the surface from the circumference of a tank, such that the foam must run across the liquid surface using only gravity as its means of propulsion via the static head from the piled up foam near the tank wall, the instant fixed roof aerated foam wand discharge head projects foam out into the tank with significant velocity, to push the foam toward the center of the tank. From the same wand foam from interior left/right discharge ports is projected to protect the area near the tank walls.

As foam accumulates in the center, it will begin to flow outwards back toward the tank walls. The foam at the tank walls will meet and flow toward the center of the tank, closing the gap between the two.

Each fixed roof wand discharge head is preferably designed to flow 1000 gpm; 600 gpm is delivered through the center stream projecting toward the center of the tank with 200 gpm projecting left and right against the tank wall. This flow rate can be regulated by an internal jet just upstream of the aeration holes. Air is introduced to the stream at the aeration holes by the Venturi effect created by the internal jet. This aerates the foam before it leaves the wand to allow for aerated foam to land on the liquid surface. The ambient air aeration chamber is preferably intended to create a relatively low expansion foam compared to other devices, in order to maintain small bubble foam. This foam is best suited for quickly and effectively running across a liquid surface, thus providing a quick coverage and extinguishment of the tank. One main objective of the fixed roof wand system is to improve upon current methods of closed roof storage tank protection. The fixed roof wand system does so by projecting foam, rather than pouring foam, and by carefully engineered discharge tip sizes and designs coupled with an efficient ambient air aerator and favorable flow rates, stream shapers and stream straighteners.

One fixed roof wand system recommended layout, for example, is as follow:

| Number of Hollow Point Systems Required for Full Surface Protection 1000 gpm Discharge from Each System | |
|---|---|
| Tank Diameter | Discharge Heads Required |
| 0'-103' | 1 |
| 104'-146' | 2 |

-continued

Number of Hollow Point Systems Required for Full Surface Protection 1000 gpm Discharge from Each System

| Tank Diameter | Discharge Heads Required |
| --- | --- |
| 147'-178' | 3 |
| 179'-206' | 4 |
| 207'-221' | 5 |
| 222'-242' | 6 |
| 242'-262' | 7 |
| 263'-280' | 8 |
| 281'-297' | 9 |
| 298'-313' | 10 |
| 314'-316' | 11 |
| 317'-330' | 12 |

Williams Fire and Hazard Control 1-800-231-4613

Note:
The application densities used in the above calculations are based upon an escalating scale from .12 gpm/ft$^2$ to .14 gpm/ft$^2$. These numbers are based upon Williams experience with extinguishing large full surface storage tank fires.

Special Methodology—Alcohols

Alcohols and related liquids and polar solvents are known to attract water out of foam bubbles. Foam, therefore, is preferably landed "lightly" on alcohols or like fluids to minimize the depth of any plunge of the foam below the liquid surface. The inventors teach that a swirl pattern may be preferable for running foam landing on alcohol or the like liquids in the case of fire. Thus the inventors teach, for tanks of alcohol or related liquids or polar solvents, a method of banking discharged foam against inner tank walls prior to landing the foam on the liquid, and discharging the foam predominantly all left or all right, from a plurality of nozzles, to develop a swirl pattern run for the foam in the tank.

Aerated Foam

The preferred foam for producing the requisite aerated foam for the instant fixed systems is to use an ambient air aeration chamber located just upstream of the nozzles. It is known in the art to produce an aeration chamber just downstream of the nozzle discharge orifice gap. In this sense the word nozzle is used to reference the portion of the barrel that contains the gap, or the swedging down to the narrowest orifice, thereby recovering the greatest head pressure for discharge. Such nozzle discharge orifice gap can discharge into an aeration chamber where aerated foam is produced and is then discharged from the aeration chamber into the atmosphere. U.S. Pat. No. 5,848,752 to Kolacz, in particular FIG. 3, illustrates this type of foam aeration nozzle. Also, U.S. Pat. No. 4,944,460 to Steingass illustrates this type of aeration foam nozzle. All things being equal, a separate aeration chamber upstream of the nozzle gap is preferred. However, one of skill in the art would recognize that such is not the only way to create aerated foam.

SUMMARY OF MAJOR COMMERCIAL EMBODIMENTS

The Point and Shoot system, at a minimum, includes installing a one or two nozzle aerated foam wand system, as a fixed system, preferably every 100' to 240' around the perimeter of a tank, which should be sufficient to extinguish tank "rim seal fires."

A good reason for also installing at least one fixed riser proximate a landing, for releasably affixing a portable monitor and nozzle, together with the above one or two nozzle system, would be to provide redundancy and backup foam protection, in case some fixed system units were damaged due to an explosion, and to provide as well a full surface foam "blanket" for "vapor suppression" should a floating roof of the tank sink. Such a fixed monitor riser would have a fire department connection at the bottom of the tank and a monitor quick disconnect fitting at the top. During an event, if needed, a firefighter could carry a lightweight aluminum monitor and nozzle to the top of a tank and install the monitor on the riser pipe using the quick disconnect fitting (approximately 2 minute installation). From this vantage point, the fire fighter could directly apply foam to needed areas. This maximizes the effectiveness of the resources available to the firefighter. The danger and hazard from laying fire hoses up a ladder on the side of the tank to implement a portable system are avoided. Williams recommends installing a fixed monitor riser pipe at locations near landings of the tank. This fixed monitor riser pipe could also be used to apply foam if necessary to any exposed areas due to a "cocked" roof or in the event a foam wand head has been compromised due to an explosion. This elementary semi-fixed system minimizes initial capital investment for protection of a tank without a fixed roof, at least from a rim seal fire and a sunken roof, while providing a proven system that is easy to operate and to maintain. The equipment eliminates the need to drag multiple hoses up a tank's ladder which impedes firefighters from getting onto or off of the tank quickly.

The Ambush system is a fixed system particularly applicable for full surface liquid tank fires and/or rim seal fires, including in large tanks, again as above, preferably for tanks without a fixed roof. The Ambush system preferably includes three nozzle aerated foam wands, with two nozzles that discharge in roughly opposing directions and that can be oriented with respect to a tank to discharge roughly horizontally. The third nozzle projects in a direction roughly perpendicular to the discharge axis defined by the first two nozzles. When oriented with respect to the tank, the third nozzle projects roughly toward the center of the tank with an appropriate angle of inclination. The third nozzle is preferably structured to land aerated foam at least 100 feet distant. All three nozzles significantly directionally project aerated foam.

The Hollow Point system is a fixed system particularly applicable to hazards and fire in large tanks with a fixed roof, and preferably can be installed in and through existing upper tank wall openings. The Hollow Point system is characterized by a conduit ending in a nozzle tip, the conduit having two side discharge ports with associated, largely interior "deflectors." The ports, conduit and nozzle are structured to pass through existing tank wall openings and to be oriented with the ports discharging in roughly opposing directions, roughly horizontally, and the nozzle tip discharging roughly toward the center. Both the nozzle and ports preferably discharge a substantially focused stream.

The heightened projection capability and foam run capability of each system described above results in the installation and servicing of significantly fewer units per tank than with previous fixed systems. The new systems can protect significantly larger tanks with less fixed equipment and in less time. A stream shaper installed in the tip of the nozzles contributes to the heightened projection capability of the nozzles, and together with the development of a properly aerated foam, produces a focused stream and optimized foam run.

Testing

As discussed above, the current accepted fixed system for protecting storage tanks comprises "foam chambers" (sometimes called "foam pourers.") Fixed foam chambers have limitations, one main limitation being their method of applying foam to a seal area. Either because of (1) the degree of aeration produced by the foam chamber and/or (2) a perceived delicacy of the foam bubble and/or the (3) dispersed footprint discharged, the chamber is structured to only gently "pour" a greatly expanded foam down onto a tank's seal. The foam chamber pours; it does not throw or project. The foam chamber relies on gravity and the head created by the pile of foam to push the foam left and right of the foam chamber. This system severely limits the distance the foam can "run," left and right of the foam chamber in the seal rim periphery area. This system requires a tank to have a large number of foam chambers spaced around the circumference, every 40 or 80 feet, depending upon whether the "foam dams" of the floating roof are 12" or 24". Many tanks are now greater than 300 foot diameter. Some are greater than 400 foot diameter. A 400 foot diameter tank with a 12" foam dam would require about 23 traditional foam chambers to protect the periphery. The instant invention requires only about 6 units to protect the same periphery.

In contrast with the currently accepted fixed systems, Williams has developed an improved aerated foam nozzle system to discharge a proven effective foam surprisingly farther, many times farther, in both left and right directions, than traditional foam chambers. Tests show, below, that the instant system covers a larger area in less time with foam that effectively extinguishes fire. Further, a rim mounted nozzle has been also demonstrated that can run foam to the center of a 400 foot diameter tank.

In December of 2010 a "proof of concept" test was run at the Williams Fire and Hazard Control test facilities. The purpose of the test was to compare and contrast, by observation, two foam application devices flowing into a simulated tank "rim seal periphery area," the ones between a tank wall and a floating roof "foam dam."

The purpose of the test was to determine whether the relative foam flow performance of the novel Williams projecting foam wand could provide the anticipated benefits compared to a conventional "foam chamber." Foam from both devices was discharged into a simulated floating roof "periphery," the ones between a tank wall and a floating roof foam dam. For each device the foam traveled through this simulated wall/foam dam "periphery" to reach and extinguish a liquid hydrocarbon pan fire, which was simulating a storage tank floating roof "rim seal fire." Flow rates and distances were recorded as elements of performance along with the delivered foam quality, foam expansion ratio and drain time.

The concept being tested was whether the foam applied through a high flow rate projecting foam wand would cover the distance in the seal area more rapidly and protect a larger segment of a floating roof seal along the periphery.

The observed test confirmed the concept. Foam from the projecting foam wand traveled 3 times the distance (120 feet versus 20 feet) in 25% less time (74 seconds versus 101 seconds from the chamber.) Both successfully extinguished a pan fire at their terminus. The novel foam wand applied foam more rapidly on the target area than the conventional foam chamber. In addition, the novel foam wand provided a gpm per square foot application rate 50% greater (0.6 versus 0.4 US gpm per square foot) than the foam chamber. Simulated periphery dimensions were 2 four inches wide and 2 four inches deep.

To summarize the test and the results, a novel aerated foam nozzle was set up on a mock seal area with a foam dam and flowed alongside a traditional foam chamber. The NFPA recognized maximum distance for a traditional foam chamber to cover is 80' total, 40' to the left and right, for a 24" foam dam. The traditional foam chamber was able to cover this distance in 1 minute 40 seconds. The novel aerated foam nozzle was able to cover an area three times greater in significantly less time. The aerated foam nozzle covered an area of 240' (120' to the left and right) in 1 minute 14 seconds. It was shown that foam applied through the novel high flow rate wand projecting left and right would cover a foam dam seal area more rapidly, travel further per device, and protect a larger segment of floating roof seal along the periphery.

Further testing of a fixed Hollow Point wand, discussed above, showed that a roughly 80'×170' pond of water (13,600 square feet) could be covered in foam with a Hollow Point wand in approximately 1 minute and 25 seconds. The furthest corner of the tank from the nozzle was 145' away. That furthest corner received ample foam coverage. The speed, run and authority of the foam was surprising.

Testing of the center nozzle of the Ambush wand, discussed above, also indicated a capacity to achieve an approximately 150' end range of a center nozzle landing footprint with the mid-point of the landing footprint at about 130'.

In August 2011 a full Ambush system was tested on a 277 foot diameter empty tank. Six three nozzle wand units were spaced around the periphery of the tank. The total flow per device was 1500 gpm giving a total system flow of 9,000 GPM. The measured footprint size of the center pointing nozzle was approximately 60 feet long by 20 feet wide with a mid-point range of approximately 90' away from the nozzle. By observation, the total surface of the tank floor was covered with foam. Photographs show testers wading knee deep in foam toward the middle of the tank.

SUMMARY OF THE INVENTION

The invention addresses fixed fire fighting systems for large industrial tanks and preferably includes two connected nozzles, each structured to project aerated foam of between 100 gpm and 900 gpm in substantially focused streams and in roughly opposing directions. The two nozzles each preferably have a stream shaper in a tip portion of the nozzle with fins of a longitudinal dimension greater than a radial dimension and which terminate substantially flush with a nozzle tip solid bore discharge orifice. The two nozzles preferably are attached proximally downstream of and in fluid communication with at least one ambient air aeration chamber structured in combination with the two nozzles to produce aerated foam having an expansion of between 2-to-1 to 8-to-1. A third nozzle of the fixed system is preferably structured to discharge between 200 gpm and 900 gpm in a direction of within 30° of a perpendicular to the discharge axis defined by the two nozzles discharging in the roughly opposing directions.

The fixed system preferably includes at least one riser for communicating water and foam concentrate, attached to and in fluid communication with the two nozzles, and possibly the third nozzle. A first riser can be attached to two connected nozzles and a second riser can be attached to a third nozzle, or alternately all nozzles can be attached to a first riser. The second riser can be located proximate to the first riser, or not. A second ambient air aeration chamber may be associated with the third nozzle to produce aerated foam. Preferably the system includes a valve attached upstream of a second ambient air aeration chamber.

The invention addresses fixed fire fighting systems for large industrial tanks also preferably including at least one first aerated foam projecting nozzle, in fluid communication with and located proximate to and downstream of an ambient air aeration chamber. The nozzle and aeration chamber are preferably structured together for producing foam with an expansion of between 2-to-1 to 8-to-1. The nozzle preferably has a stream shaper in its tip and is affixed to the tank so as to discharge a substantially focused stream roughly horizontally along an upper inner tank wall portion. A centrally directed nozzle is preferably also affixed proximate the top tank wall, located and structured to discharge roughly toward the center of the tank.

The centrally directed nozzle may be in fluid communication with an aeration chamber located proximate to and upstream of the centrally directed nozzle. The centrally directed nozzle may have a stream shaper in its tip and be structured to produce foam in combination with the aeration chamber having an expansion of 2-to-1 to 8-to-1.

Preferably there are two aerated foam projecting nozzles affixed to the tank so as to discharge a substantially focused stream roughly horizontally and in roughly opposing directions. Preferably the aerated foam projecting nozzle or nozzles are structured to discharge between 100 gpm and 900 gpm. Preferably the aerated foam projecting nozzle or nozzles are attached to the tank and to a riser attached proximate the tank.

The invention also addresses fixed systems for fighting fire in large industrial tanks with a fixed roof, preferably including a first ambient air aeration chamber located upstream of, and fluid communication with, and proximate to, a fire fighting nozzle. The first ambient air aeration chamber is preferably structured to produce aerated foam. The fire fighting nozzle preferably includes at least one stream shaper located in a tip portion of the nozzle. The stream shaper preferably has fins with a longitudinal dimension greater than a radial dimension, and the fins preferably terminate substantially flush with a solid bore tip discharge orifice. At least two discharge ports are preferably located in a fluid conduit between the aeration chamber and the nozzle tip with each discharge port having a deflector portion located in the conduit proximate the port for deflecting fluid passing through the conduit out the port. A stream straightener is also preferably located upstream of and proximate the discharge ports. Stream straighteners (for locating upstream of a discharge orifice) are known in the art and can be purchased, for instance, from Elkhart Brass.

The invention also includes a fixed aerated foam fire fighting system for a tank with a fixed roof including a first ambient air aeration chamber located upstream of, and fluid communication with, and proximate to, a forcefully projecting fire fighting nozzle, forcefully projecting aerated foam in a substantially focused stream, with the aeration chamber structured to produce aerated foam. The invention includes at least two discharge ports in a fluid conduit between the aeration chamber and a nozzle tip, each port having a deflector portion located in the conduit proximate to the port to deflect fluid to the port. The invention preferably includes a stream straightener located upstream of and proximate the discharge ports. (Such mid-stream stream straighteners are known in the art.)

Preferably the ambient air aeration chamber is structured to produce aerated foam roughly horizontally with an expansion of between 2-to-1 to 8-to-1, and more preferably with an expansion of between 3-to-1 to 5-to-1.

Preferably the at least two discharge ports are structured to discharge aerated foam roughly horizontally in roughly opposing directions. Preferably the system includes an at least four inch riser structured for communicating fire fighting fluid outside of the tank wall and in fluid communication with the aeration chamber. Preferably a vapor membrane is located between the riser and the aeration chamber.

The invention also includes an aeration chamber structured to produce aerated foam with an expansion of between 2-to-1 to 8-to-1, and a fluid conduit attached between the aeration chamber and a nozzle tip. The nozzle is structured to forcefully project between 200 gpm and 1000 gpm, at 100 psi, of aerated foam with an expansion of between 2-to-1 to 8-to-1, in a substantially focused stream. The conduit includes a pair of substantially opposing discharge ports with interior deflector surfaces, the surfaces structured to deflect a portion of fire fighting fluid passing through the conduit toward the ports.

The invention also includes a fixed system fire fighting method for an industrial tank, including projecting aerated foam substantially horizontally along inner tank wall portions in an substantially focused stream from at least one aerated foam projecting nozzle. The method includes producing from the nozzle aerated foam having an expansion of between 2-to-1 to 8-to-1 and forcefully projecting foam from a center directed nozzle roughly toward the center of the tank, the center directed nozzle affixed proximate an inner tank wall portion. Preferably the invention includes projecting aerated foam substantially horizontally along inner tank wall portions from a first and second aerated foam projecting nozzle, roughly horizontally and in generally opposing directions.

The invention also includes a method for extinguishing fire in a fixed roof large industrial tank, including affixing a conduit, having an aerated foam, forcefully projecting nozzle at its distal end, through an opening at a top portion of a large industrial tank wall. The invention preferably includes forcefully projecting aerated foam, having an expansion of between 2-to-1 to 8-to-1, radially toward the center of the tank in a substantially focused stream and projecting aerated foam through two discharge ports on the side of the conduit, roughly horizontally and in roughly opposing directions, along interior side wall portions of the tank.

BRIEF DESCRIPTION OF THE DRAWINGS

A better understanding of the present invention can be obtained when the following detailed description of the preferred embodiments are considered in conjunction with the following drawings, in which:

FIG. 3A indicates the embodiment of FIG. 1 including the attachment of the three nozzles to a single riser located proximate the outside tank wall of a tank.

FIGS. 3B and 3C illustrate alternate embodiments for a fixed system with the aerated foam projecting nozzles projecting horizontally along the tank wall and including the center pointing nozzle. FIGS. 3B and 3C illustrate that the center pointing nozzle can be attached to its own riser, independently of the riser for the pair of aerated foam projecting nozzles projecting horizontally along the inner tank wall.

FIGS. 5A-5F are drawings of the "wand head" of FIG. 3A in detail, the wand head including nozzle wand head with a center pointing nozzle and a pair of left/right foam projecting inner wall nozzles.

FIG. 6 is relevant because of FIG. 3B. FIG. 3B presents an embodiment where the riser for the center pointing nozzle is separate from the riser for the two left/right directed nozzles. Hence, the center pointing nozzle can actually be located independently and separately from the left/right directed nozzles, using its own riser. Preferably a riser includes a riser top portion, a riser extension pipe and a riser inlet pipe, as illustrated in FIG. 6.

FIG. 7 illustrates a foot rest kit to help support an independent riser, also attached by brackets to a tank wall.

FIGS. 8A-8G illustrates with drawings the embodiment of FIG. 6 for establishing a fixed riser proximate a tank wall, useful for attaching a center pointing nozzle.

FIG. 9 is a table correlating preferred flow rates for the left right pointing nozzle and the center pointing nozzle, referred to as "upper," to tank diameters.

FIG. 14 illustrates a fixed nozzle wand for fitting into an existing opening of a tank with a fixed roof.

FIG. 15 is a partial cutaway of the nozzle of FIG. 14.

FIG. 16 is a side view of the nozzle of FIG. 14, showing the fixed nozzle wand installed through a tank wall.

FIG. 17 shows the embodiment of FIG. 14 together with a riser to form a full wand.

FIG. 18 shows the embodiment of FIG. 14 together with the riser to form a full wand attached to a tank wall.

FIG. 20 illustrates the number of fixed nozzle systems with dual side ports required for full surface protection of a fixed roof tank, by tank diameter.

The drawings are primarily illustrative. It would be understood that structure may have been simplified and details omitted in order to convey certain aspects of the invention. Scale may be sacrificed to clarity.

DETAILED DESCRIPTION OF THE PREFERRED EMBODIMENTS

Figure 1:
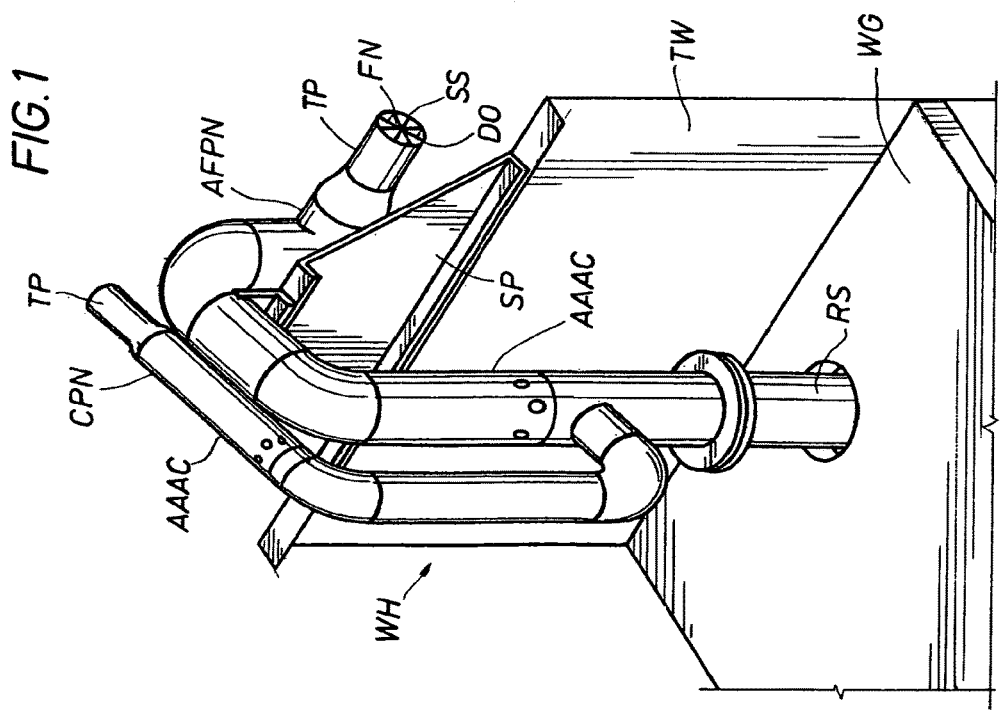
FIG. 1 illustrates an embodiment of a fixed system having two aerated foam projecting nozzles discharging foam in opposing directions, roughly horizontally, along a top portion of a tank wall and having a third center projecting nozzle connected thereto, with the projecting nozzle and the pair of aerated foam projecting nozzles each having their own ambient air aeration chamber proximately upstream.

FIG. 1 illustrates a preferred embodiment of a wand head WH for a fixed fire fighting system for a large industrial tank. The wand head WH is indicated as installed proximate to the tank wall portion TW, in fact utilizing support panel SP for extra support. The nozzles AFPN and CPN of the wand head are located with respect of the tank to discharge just over the tank wall. The embodiment of FIG. 1 includes center pointing nozzle CPN and a pair of aerating foam projecting nozzles AFPN. The aerating foam projecting nozzles discharge substantially horizontally and in roughly opposing directions along an upper interior edge of the tank wall TW. The aerated foam projecting nozzles are shown with a tip portion TP and a stream shaper SS located in the tip having fins FN that terminate substantially flush with the discharge opening DO of the tip. Riser RS passes through the wind girder WG and furnishes water and foam concentrate to the embodiment of three nozzles. Each nozzle is shown with its own ambient air aeration chamber AAAC locating proximate to the nozzle and just upstream of the nozzle.

Figure 2:
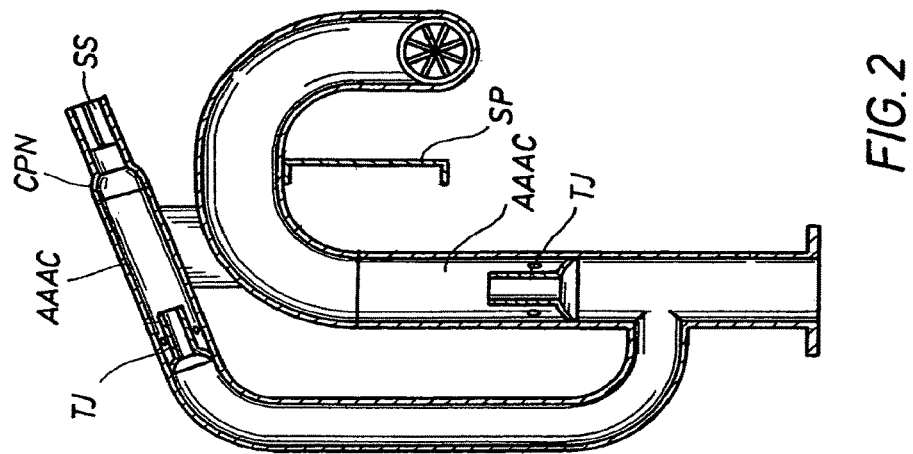
FIG. 2 is a cut-away view of the embodiment of FIG. 1.
Figure 3C:
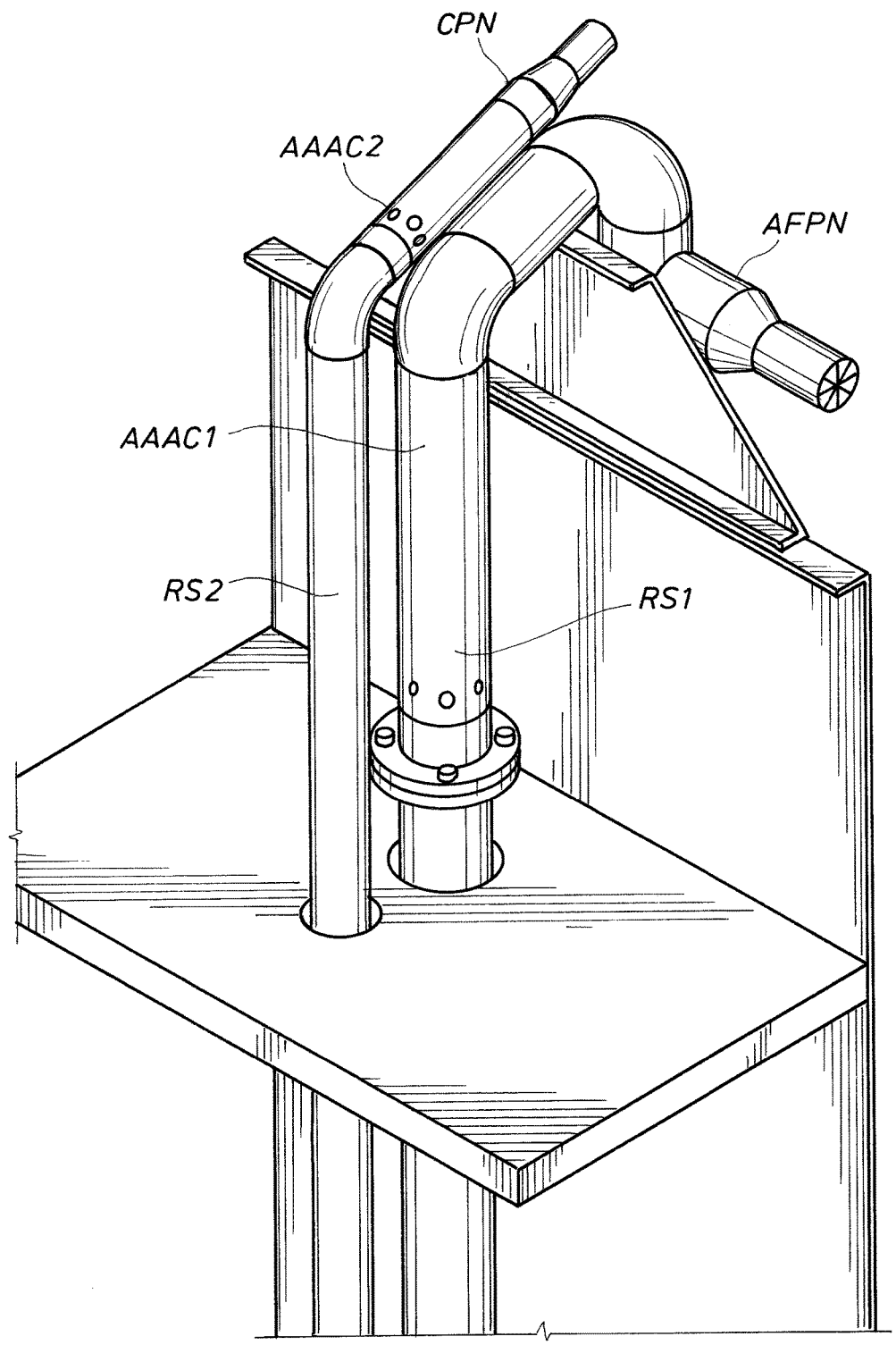

FIG. 2 is a partial cutaway of the embodiment of FIG. 1. The ambient air aeration chambers can be shown to be of a tubular jets type having a tubular jets TJ within ports for drawing in air in a fashion known in the art. The embodiment of FIG. 1 is further illustrated in FIG. 3 showing a full riser RS coming from proximate the ground and rising to proximate the top of the tank wall TW. The riser passes through the wind girder WG.

FIGS. 3B-1 and 3B-2 illustrates an alternate embodiment of the instant fixed system invention illustrated in FIG. 3A. In FIG. 3B the center pointing nozzle CPN, although nominally attached to the conduit of the pair of aerated foam projecting nozzles AFPN, has not only its separate ambient air aeration chamber AAAC2 (from AAAC1) but its separate riser RS2 (from RS1.) Given the configuration of FIG. 3B, it is clear that the center pointing nozzle can actually be physically separated from the wand of the pair of aerated foam projecting nozzles. Each can have their own aeration chamber and each can have their own riser.

It becomes further apparent that riser RS2 not only need not be located next to riser one RS1, but the nozzle attached to the second riser could actually be any effective fire fighting nozzle for discharging foam to cover center portions of the tank. It may, but need not have, a proximate ambient air aeration chamber AAAC2. It could be a nozzle of the sort that relies upon aeration by virtue of substantial flight of the air.

Figure 4A:
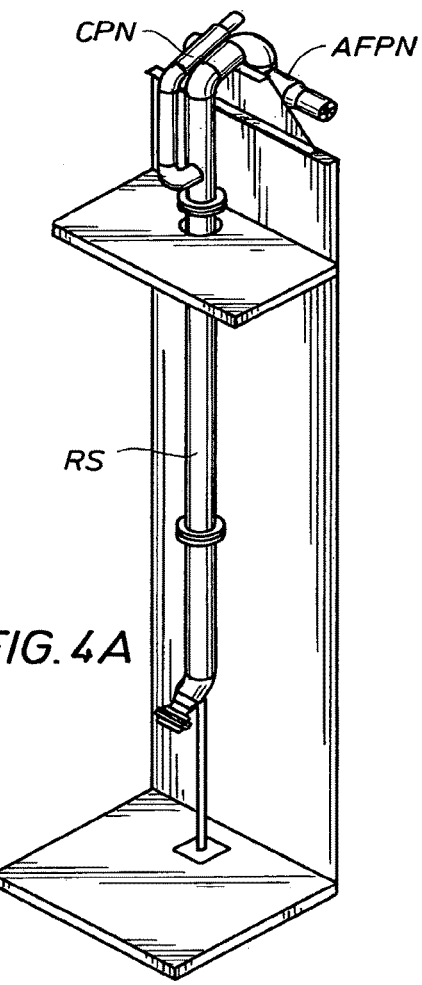
FIGS. 4A-4D are drawings illustrating the embodiment of FIG. 3A in detail.
Figure 4B:
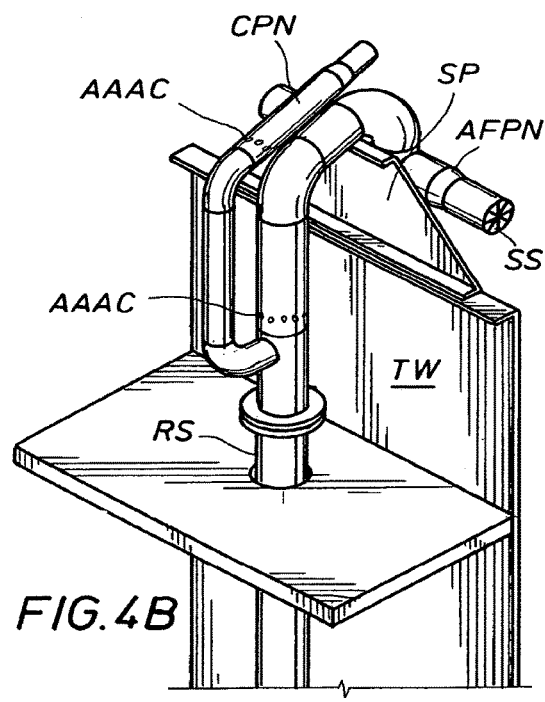
Figure 4C:
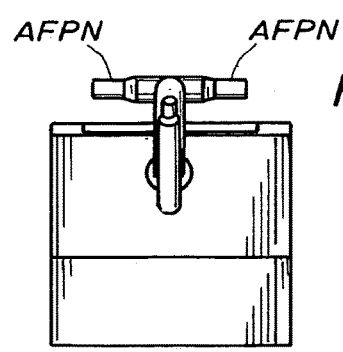
Figure 4D:
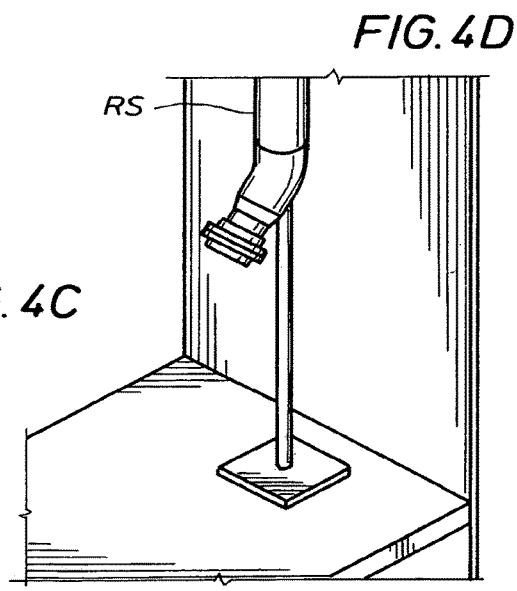
Figure 5E:
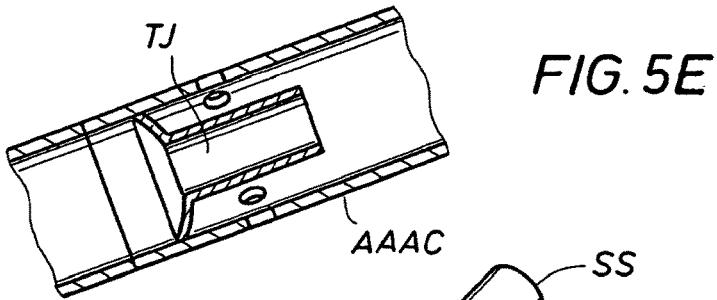
Figure 5F:
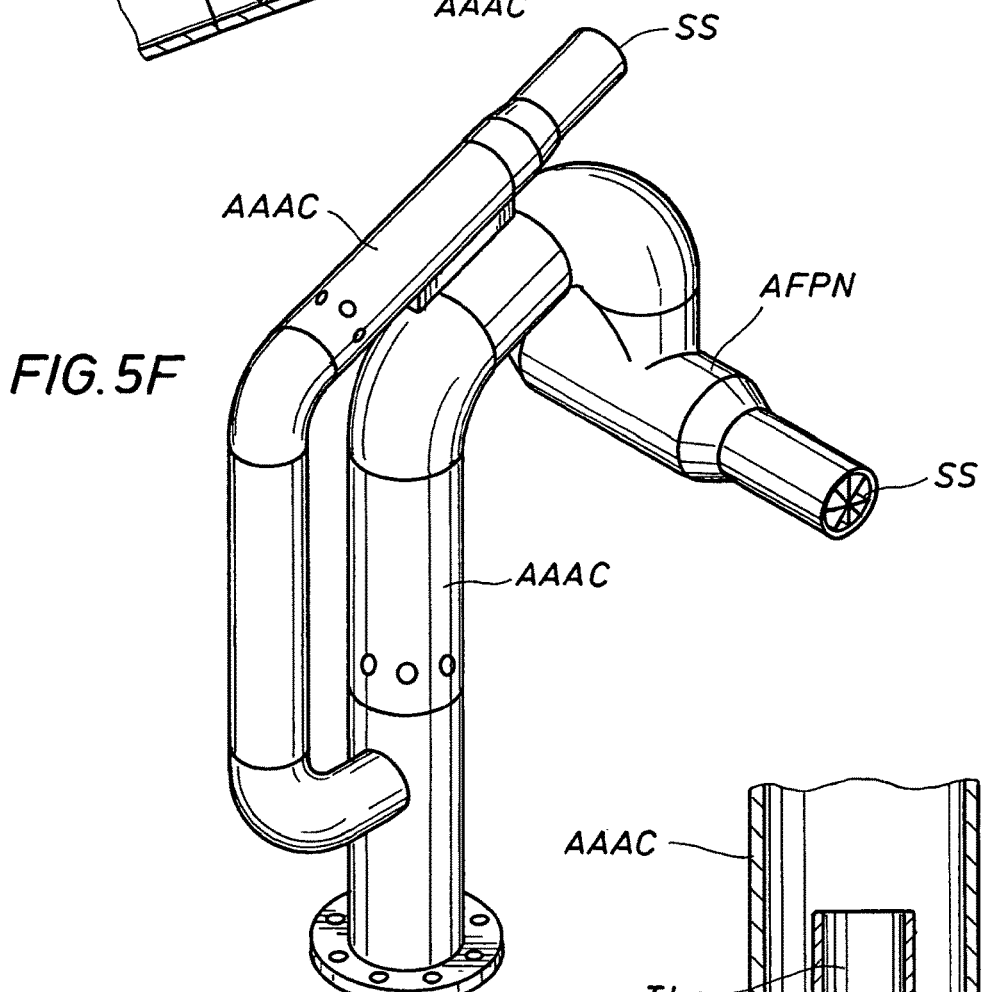
Figure 5D:
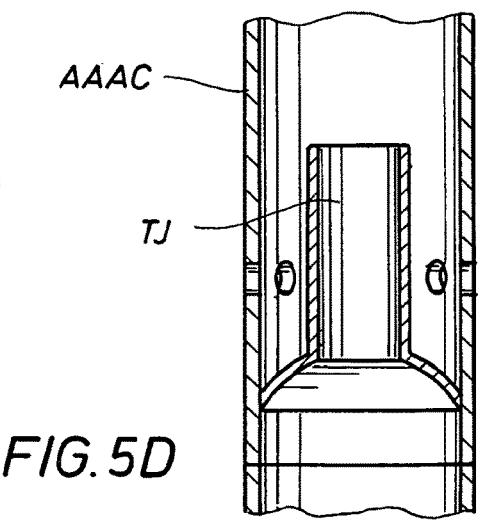
Figure 8A:
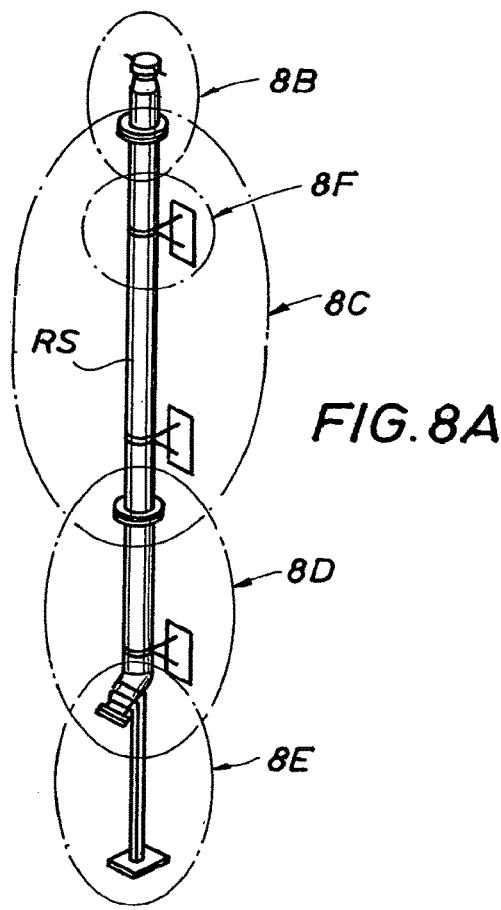
Figure 8C:
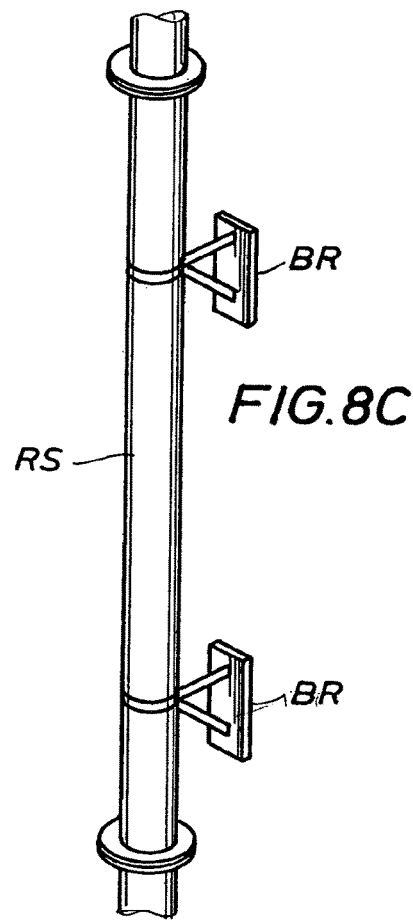
Figure 8B:
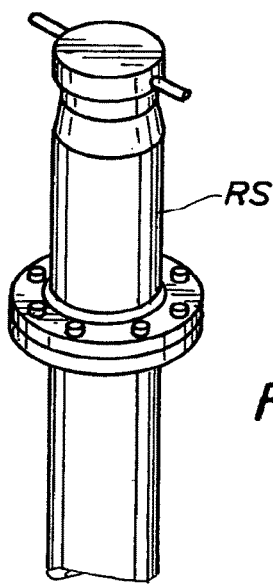
Figure 8E:
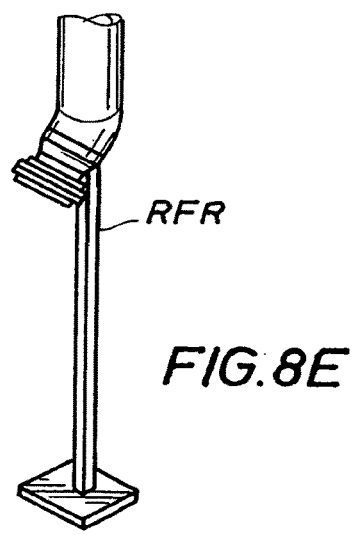

FIGS. 4A-4D offer a drawing sheet showing particulars of the wand head of the embodiment of FIG. 1. FIG. 4C illustrates by dashed lines the roughly horizontal direction and roughly opposing directions of the pair of aerated foam projecting nozzles.

FIGS. 5A-5F show further details of the wand head of the embodiment of FIG. 1 including drawing cutaways showing the tubular jet TJ in the aeration chamber AAAC, the stream shaper SS and the fins FN therein.

FIG. 6 illustrates three sections of a potentially free standing riser that might be used to separately locate a center pointing nozzle of any appropriate size and style. These riser portions, including a riser top portion RTP, a riser extension pipe REP and riser inlet pipe RIP, are intended to be joined together and provide a free standing riser for attaching (most likely) a center pointing nozzle. The center pointing nozzle could be fixedly attached, and as discussed previously, need not necessarily include an ambient air aeration chamber. FIG. 7 illustrates a riser foot rest RFR and a bracket BR both useful for securing a riser RS proximate a tank wall. FIGS. 8A-8G illustrates in further detail a riser RS and method and apparatus for securing a riser proximate and adjacent a tank wall, including brackets BR and riser footrest RFR.

FIG. 9 illustrates figuring a three nozzle fixed wand configuration into a system for tank sizes from 150 foot diameter to a 500 foot diameter. A proposed optimum flow both for the left and right pointing aerating projecting nozzles and for upper and center pointing nozzles is indicated.

Figure 10:
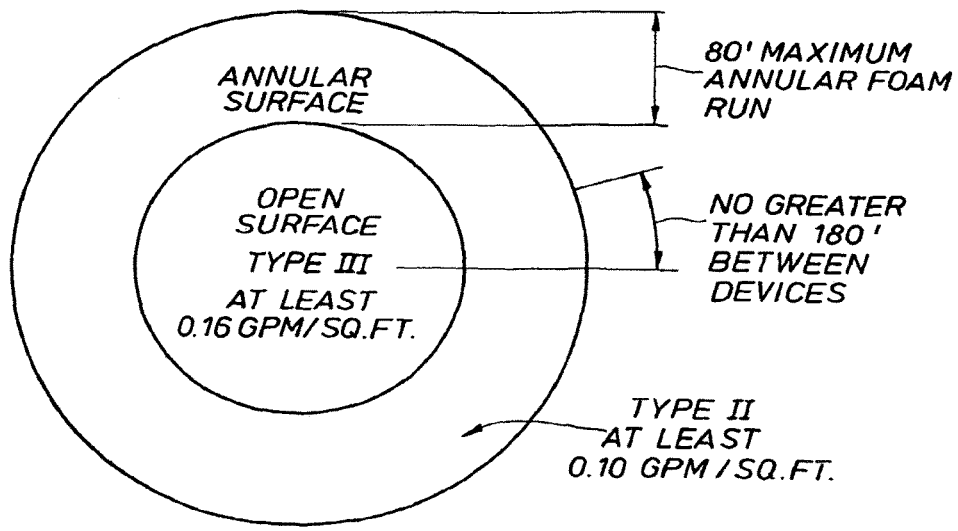
FIG. 10 illustrates planning for an arrangement of nozzles of the Ambush system, including the three fixed nozzle type, given a tank size.

FIG. 10 illustrates calculations that affect the type and number of fixed three nozzle wands required for a tank surface. FIG. 10 indicates that in the annular area, supplied with foam by the aerated foam protecting nozzles, an application rate of 0.10 gpm per square foot is recommended. For the open surface area of the middle of the tank, an application rate of at least 0.16 gpm per square foot is recommended.

Figure 11:
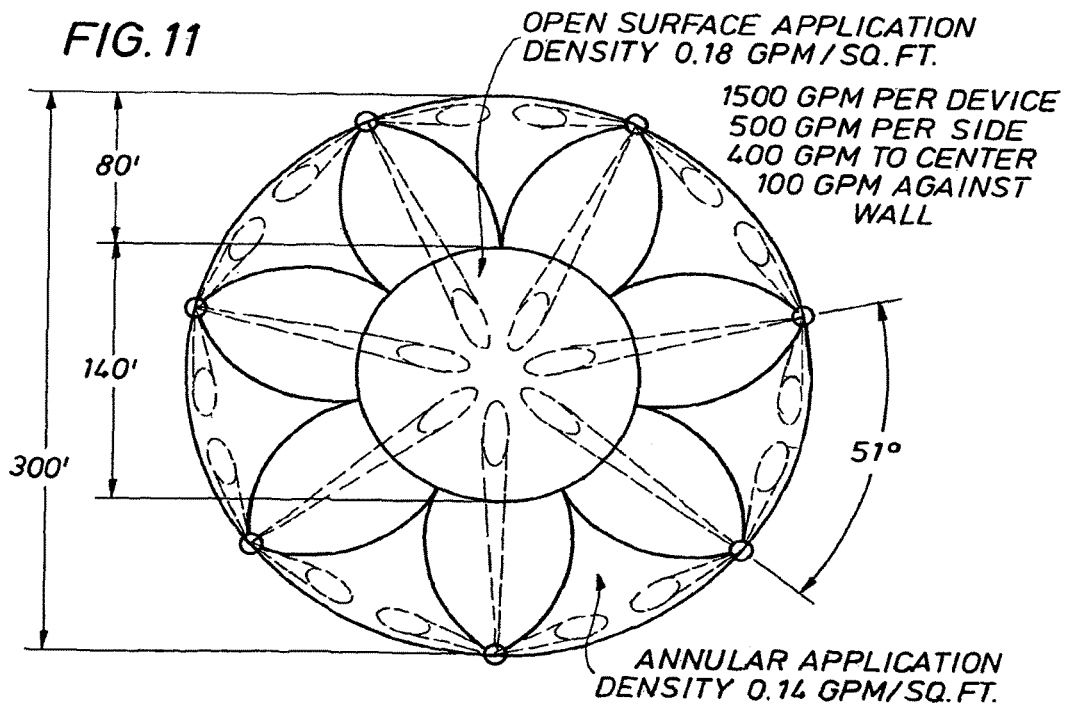
FIG. 11 illustrates a proposed placement of three nozzle fixed wands to cover a fire in a 300 foot diameter tank.

FIG. 11 represents calculations for a fixed system of the instant invention for a 300 foot diameter tank. The tank is shown configured with seven fixed systems discharging left, right, and toward the center. Application rate densities are indicated. Total gpm for all devices is indicated as well as the gpm per three nozzle wand. A gpm against the wall indicated in FIG. 11 comes from a port in the conduit that discharges up to 150 gpm down under any wand as a safeguard.

Figure 12:
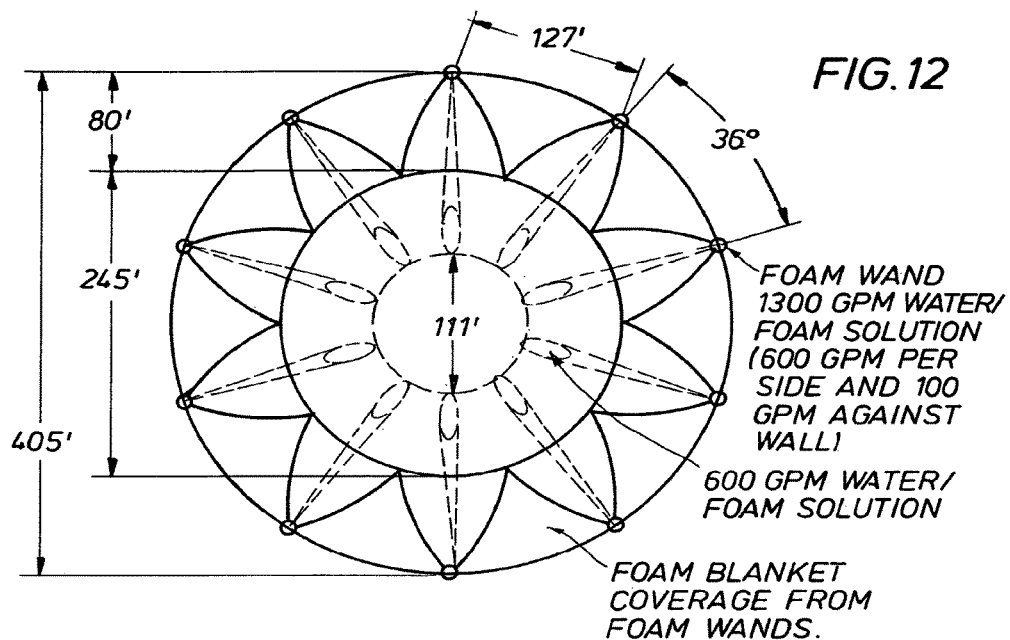
FIG. 12 illustrates staging three nozzle wands around a 405 foot diameter tank, including gpms.

FIG. 12 illustrates calculations for a 405 foot diameter tank where ten three nozzle wands are proposed each wand providing 1,300 gpm total against the inner wall and 600 gpm toward the center. FIG. 12 indicates a design of a fixed three nozzle aerated foam wand system for extinguishing a full surface liquid tank fire in a 405 foot diameter tank. Ten dispersing units are prescribed. Each unit is assumed to have three nozzles, one dispersing to the left, one to the right and one toward the center. All three nozzles disperse 600 gpm. In addition 100 gpm is dispersed downward against the wall. (This fourth direction may not be needed, or may be optional). The landing footprints for the ten nozzles discharging toward the center of the tank are predicted to project a footprint to land approximately 150 feet away from the tank wall. The foam should easily run an additional 55 feet or so toward the center, as well as return back toward the wall 30 feet or more to meet foam from the nozzles discharging left and right expanding toward the center of the tank from the walls. The drawing FIG. 12 in addition indicates a fallout region from the discharge path of the nozzles discharging toward the center of the tank. The fallout region supplies foam into mid-radial annular areas of the tank. The drawing indicates a capacity to blanket a 400 foot diameter tank with foam using ten fixed units.

An attached spreadsheet shows how the three nozzle fixed system can plan and provide a fixed system full surface fire protection for tank sizes from 100 foot diameter to 500 foot diameter.

| Tank Size | Number of Devices | Desired Application Density | Actual Application Density | Surface Area of Tank | Tank Circumference | Distance Between Devices (<180') | Total Flow Required to Achieve Desired Application Density | Flow Required From Each Device (<Actual) | Actual Total Flow | Actual Flow from each Device (GPM) |
|---|---|---|---|---|---|---|---|---|---|---|
| 100 | 2 | 0.12 | 0.17 | 7850 | 314 | 157 | 942 | 471 | 1300 | 650 |
| 110 | 2 | 0.12 | 0.14 | 9499 | 345 | 173 | 1140 | 570 | 1300 | 650 |
| 120 | 3 | 0.12 | 0.17 | 11304 | 377 | 126 | 1356 | 452 | 1950 | 650 |
| 130 | 3 | 0.12 | 0.15 | 13267 | 408 | 136 | 1592 | 531 | 1950 | 650 |
| 140 | 3 | 0.12 | 0.13 | 15386 | 440 | 147 | 1846 | 615 | 1950 | 650 |
| 150 | 4 | 0.12 | 0.15 | 17663 | 471 | 118 | 2120 | 530 | 2600 | 650 |
| 160 | 4 | 0.12 | 0.13 | 20096 | 502 | 126 | 2412 | 603 | 2600 | 650 |
| 170 | 3 | 0.12 | 0.15 | 22687 | 534 | 178 | 2722 | 907 | 3300 | 1100 |
| 180 | 4 | 0.12 | 0.17 | 25434 | 565 | 141 | 3052 | 763 | 4400 | 1100 |
| 190 | 4 | 0.12 | 0.16 | 28339 | 597 | 149 | 3401 | 850 | 4400 | 1100 |
| 200 | 4 | 0.12 | 0.14 | 31400 | 628 | 157 | 3768 | 942 | 4400 | 1100 |
| 210 | 4 | 0.12 | 0.13 | 34619 | 659 | 165 | 4154 | 1039 | 4400 | 1100 |
| 220 | 5 | 0.12 | 0.14 | 37994 | 691 | 138 | 4559 | 912 | 5500 | 1100 |
| 230 | 5 | 0.12 | 0.13 | 41527 | 722 | 144 | 4983 | 997 | 5500 | 1100 |
| 240 | 5 | 0.13 | 0.17 | 45216 | 754 | 151 | 5878 | 1176 | 7500 | 1500 |
| 250 | 5 | 0.13 | 0.15 | 49063 | 785 | 157 | 6378 | 1276 | 7500 | 1500 |
| 260 | 5 | 0.13 | 0.14 | 53066 | 816 | 163 | 6899 | 1380 | 7500 | 1500 |
| 270 | 5 | 0.13 | 0.13 | 57227 | 848 | 170 | 7439 | 1488 | 7500 | 1500 |
| 280 | 6 | 0.13 | 0.15 | 61544 | 879 | 147 | 8001 | 1333 | 9000 | 1500 |
| 290 | 6 | 0.13 | 0.14 | 66019 | 911 | 152 | 8582 | 1430 | 9000 | 1500 |
| 300 | 7 | 0.13 | 0.15 | 70650 | 942 | 135 | 9185 | 1312 | 10500 | 1500 |
| 310 | 8 | 0.13 | 0.16 | 75439 | 973 | 122 | 9807 | 1226 | 12000 | 1500 |
| 320 | 6 | 0.14 | 0.14 | 80384 | 1005 | 167 | 11254 | 1876 | 11400 | 1900 |
| 330 | 7 | 0.14 | 0.16 | 85487 | 1036 | 148 | 11968 | 1710 | 13300 | 1900 |
| 340 | 7 | 0.14 | 0.15 | 90746 | 1068 | 153 | 12704 | 1815 | 13300 | 1900 |
| 350 | 8 | 0.14 | 0.16 | 96163 | 1099 | 137 | 13463 | 1683 | 15200 | 1900 |
| 360 | 9 | 0.15 | 0.17 | 101736 | 1130 | 126 | 15260 | 1696 | 17100 | 1900 |
| 370 | 8 | 0.15 | 0.16 | 107467 | 1162 | 145 | 16120 | 2015 | 16800 | 2100 |
| 380 | 9 | 0.15 | 0.17 | 113354 | 1193 | 133 | 17003 | 1889 | 18900 | 2100 |
| 390 | 9 | 0.15 | 0.16 | 119399 | 1225 | 136 | 17910 | 1990 | 18900 | 2100 |
| 400 | 10 | 0.15 | 0.17 | 125600 | 1256 | 126 | 18840 | 1884 | 21000 | 2100 |
| 410 | 10 | 0.15 | 0.16 | 131959 | 1287 | 129 | 19794 | 1979 | 21000 | 2100 |
| 420 | 9 | 0.16 | 0.18 | 138474 | 1319 | 147 | 22156 | 2462 | 24300 | 2700 |
| 430 | 10 | 0.16 | 0.19 | 145147 | 1350 | 135 | 23223 | 2322 | 27000 | 2700 |
| 440 | 10 | 0.16 | 0.18 | 151976 | 1382 | 138 | 24316 | 2432 | 27000 | 2700 |
| 450 | 11 | 0.16 | 0.19 | 158963 | 1413 | 128 | 25434 | 2312 | 29700 | 2700 |
| 460 | 12 | 0.16 | 0.20 | 166106 | 1444 | 120 | 26577 | 2215 | 32400 | 2700 |
| 470 | 13 | 0.16 | 0.20 | 173407 | 1476 | 114 | 27745 | 2134 | 35100 | 2700 |
| 480 | 13 | 0.16 | 0.19 | 180864 | 1507 | 116 | 28938 | 2226 | 35100 | 2700 |
| 490 | 14 | 0.16 | 0.20 | 188479 | 1539 | 110 | 30157 | 2154 | 37800 | 2700 |
| 500 | 15 | 0.16 | 0.21 | 196250 | 1570 | 105 | 31400 | 2093 | 40500 | 2700 |

-continued

Ambush System

| Flow Breakdown (GPM) | | | | Open Surface | | | | Annular Area | | | 3"-5" Foam |
|---|---|---|---|---|---|---|---|---|---|---|---|
| Left | Right | Upper | Wall | Surface Diameter | Surface Area | Application Density | Total Upper Flow (GPM) | Surface Area | Total Flow | Application Density | Blanket (minutes) |
| 300 | 300 | 0 | 50 | 0 | 0 | 0.00 | 0 | 7850 | 1300 | 0.17 | 3.7 |
| 300 | 300 | 0 | 50 | 0 | 0 | 0.00 | 0 | 9499 | 1300 | 0.14 | 4.5 |
| 300 | 300 | 0 | 50 | 0 | 0 | 0.00 | 0 | 11304 | 1950 | 0.17 | 3.6 |
| 300 | 300 | 0 | 50 | 0 | 0 | 0.00 | 0 | 13267 | 1950 | 0.15 | 4.2 |
| 300 | 300 | 0 | 50 | 0 | 0 | 0.00 | 0 | 15386 | 1950 | 0.13 | 4.9 |
| 300 | 300 | 0 | 50 | 0 | 0 | 0.00 | 0 | 17663 | 2600 | 0.15 | 4.2 |
| 300 | 300 | 0 | 50 | 0 | 0 | 0.00 | 0 | 20096 | 2600 | 0.13 | 4.8 |
| 400 | 400 | 200 | 100 | 10 | 79 | 7.64 | 600 | 22608 | 2700 | 0.12 | 4.3 |
| 400 | 400 | 200 | 100 | 20 | 314 | 2.55 | 800 | 25120 | 3600 | 0.14 | 3.6 |
| 400 | 400 | 200 | 100 | 30 | 707 | 1.13 | 800 | 27632 | 3600 | 0.13 | 4.0 |
| 400 | 400 | 200 | 100 | 40 | 1256 | 0.64 | 800 | 30144 | 3600 | 0.12 | 4.4 |
| 400 | 400 | 200 | 100 | 50 | 1963 | 0.41 | 800 | 32656 | 3600 | 0.11 | 4.9 |
| 400 | 400 | 200 | 100 | 60 | 2826 | 0.35 | 1000 | 35168 | 4500 | 0.13 | 4.3 |
| 400 | 400 | 200 | 100 | 70 | 3847 | 0.26 | 1000 | 37680 | 4500 | 0.12 | 4.7 |
| 500 | 500 | 400 | 100 | 80 | 5024 | 0.40 | 2000 | 40192 | 5500 | 0.14 | 3.7 |
| 500 | 500 | 400 | 100 | 90 | 6359 | 0.31 | 2000 | 42704 | 5500 | 0.13 | 4.1 |
| 500 | 500 | 400 | 100 | 100 | 7850 | 0.25 | 2000 | 45216 | 5500 | 0.12 | 4.4 |
| 500 | 500 | 400 | 100 | 110 | 9499 | 0.21 | 2000 | 47728 | 5500 | 0.12 | 4.7 |
| 500 | 500 | 400 | 100 | 120 | 11304 | 0.21 | 2400 | 50240 | 6600 | 0.13 | 4.2 |
| 500 | 500 | 400 | 100 | 130 | 13267 | 0.18 | 2400 | 52752 | 6600 | 0.13 | 4.5 |
| 500 | 500 | 400 | 100 | 140 | 15386 | 0.18 | 2800 | 55264 | 7700 | 0.14 | 4.2 |
| 500 | 500 | 400 | 100 | 150 | 17663 | 0.18 | 3200 | 57776 | 8800 | 0.15 | 3.9 |
| 600 | 600 | 600 | 100 | 160 | 20096 | 0.18 | 3600 | 60288 | 7800 | 0.13 | 4.4 |
| 600 | 600 | 600 | 100 | 170 | 22687 | 0.19 | 4200 | 62800 | 9100 | 0.14 | 4.0 |
| 600 | 600 | 600 | 100 | 180 | 25434 | 0.17 | 4200 | 65312 | 9100 | 0.14 | 4.2 |
| 600 | 600 | 600 | 100 | 190 | 28339 | 0.17 | 4800 | 67824 | 10400 | 0.15 | 3.9 |
| 600 | 600 | 600 | 100 | 200 | 31400 | 0.17 | 5400 | 70336 | 11700 | 0.17 | 3.7 |
| 600 | 600 | 800 | 100 | 210 | 34619 | 0.18 | 6400 | 72848 | 10400 | 0.14 | 4.0 |
| 600 | 600 | 800 | 100 | 220 | 37994 | 0.19 | 7200 | 75360 | 11700 | 0.16 | 3.7 |
| 600 | 600 | 800 | 100 | 230 | 41527 | 0.17 | 7200 | 77872 | 11700 | 0.15 | 3.9 |
| 600 | 600 | 800 | 100 | 240 | 45216 | 0.18 | 8000 | 80384 | 13000 | 0.16 | 3.7 |
| 600 | 600 | 800 | 100 | 250 | 49063 | 0.16 | 8000 | 82896 | 13000 | 0.16 | 3.9 |
| 800 | 800 | 1000 | 100 | 260 | 53066 | 0.17 | 9000 | 85408 | 15300 | 0.18 | 3.5 |
| 800 | 800 | 1000 | 100 | 270 | 57227 | 0.17 | 10000 | 87920 | 17000 | 0.19 | 3.3 |
| 800 | 800 | 1000 | 100 | 280 | 61544 | 0.16 | 10000 | 90432 | 17000 | 0.19 | 3.5 |
| 800 | 800 | 1000 | 100 | 290 | 66019 | 0.17 | 11000 | 92944 | 18700 | 0.20 | 3.3 |
| 800 | 800 | 1000 | 100 | 300 | 70650 | 0.17 | 12000 | 95456 | 20400 | 0.21 | 3.2 |
| 800 | 800 | 1000 | 100 | 310 | 75439 | 0.17 | 13000 | 97968 | 22100 | 0.23 | 3.1 |
| 800 | 800 | 1000 | 100 | 320 | 80384 | 0.16 | 13000 | 100480 | 22100 | 0.22 | 3.2 |
| 800 | 800 | 1000 | 100 | 330 | 85487 | 0.16 | 14000 | 102992 | 23800 | 0.23 | 3.1 |
| 800 | 800 | 1000 | 100 | 340 | 90746 | 0.17 | 15000 | 105504 | 25500 | 0.24 | 3.0 |

| Seal Area | Seal Area Time | 1% foam flow | 3% foam flow | Open Surface Area of Meet 0.16 Requirement | Acceptable? Actual >= Requirement | Equivalent Open Surface |
|---|---|---|---|---|---|---|
| 615 | 1.3 | 715 | 2145 | 0 | YES | 0 |
| 678 | 1.4 | 715 | 2145 | 0 | YES | 0 |
| 741 | 1.0 | 1073 | 3218 | 0 | YES | 0 |
| 804 | 1.1 | 1073 | 3218 | 0 | YES | 0 |
| 867 | 1.2 | 1073 | 3218 | 0 | YES | 0 |
| 929 | 1.0 | 1430 | 4290 | 0 | YES | 0 |
| 992 | 1.0 | 1430 | 4290 | 0 | YES | 0 |
| 1055 | 0.9 | 2145 | 6435 | 3750 | YES | 69 |
| 1118 | 0.7 | 2860 | 8580 | 5000 | YES | 80 |
| 1181 | 0.7 | 2860 | 8580 | 5000 | YES | 80 |
| 1243 | 0.8 | 2860 | 8580 | 5000 | YES | 80 |
| 1306 | 0.8 | 2860 | 8580 | 5000 | YES | 80 |
| 1369 | 0.7 | 3575 | 10725 | 6250 | YES | 89 |
| 1432 | 0.7 | 3575 | 10725 | 6250 | YES | 89 |
| 1495 | 0.5 | 4875 | 14625 | 12500 | YES | 126 |
| 1557 | 0.6 | 4875 | 14625 | 12500 | YES | 126 |
| 1620 | 0.6 | 4875 | 14625 | 12500 | YES | 126 |
| 1683 | 0.6 | 4875 | 14625 | 12500 | YES | 126 |
| 1746 | 0.5 | 5850 | 17550 | 15000 | YES | 138 |
| 1809 | 0.5 | 5850 | 17550 | 15000 | YES | 138 |
| 1871 | 0.5 | 6825 | 20475 | 17500 | YES | 149 |
| 1934 | 0.4 | 7800 | 23400 | 20000 | YES | 160 |
| 1997 | 0.5 | 7410 | 22230 | 22500 | YES | 169 |

-continued

| | | | | | | |
|---|---|---|---|---|---|---|
| 2060 | 0.4 | 8645 | 25935 | 26250 | YES | 183 |
| 2123 | 0.4 | 8645 | 25935 | 26250 | YES | 183 |
| 2185 | 0.4 | 9880 | 29640 | 30000 | YES | 195 |
| 2248 | 0.3 | 11115 | 33345 | 33750 | YES | 207 |
| 2311 | 0.4 | 10920 | 32760 | 40000 | YES | 226 |
| 2374 | 0.3 | 12285 | 36855 | 45000 | YES | 239 |
| 2437 | 0.3 | 12285 | 36855 | 45000 | YES | 239 |
| 2499 | 0.3 | 13650 | 40950 | 50000 | YES | 252 |
| 2562 | 0.3 | 13650 | 40950 | 50000 | YES | 252 |
| 2625 | 0.3 | 15795 | 47385 | 56250 | YES | 268 |
| 2688 | 0.3 | 17550 | 52650 | 62500 | YES | 282 |
| 2751 | 0.3 | 17550 | 52650 | 62500 | YES | 282 |
| 2813 | 0.2 | 19305 | 57915 | 68750 | YES | 296 |
| 2876 | 0.2 | 21060 | 63180 | 75000 | YES | 309 |
| 2939 | 0.2 | 22815 | 68445 | 81250 | YES | 322 |
| 3002 | 0.2 | 22815 | 68445 | 81250 | YES | 322 |
| 3065 | 0.2 | 24570 | 73710 | 87500 | YES | 334 |
| 3127 | 0.2 | 26325 | 78975 | 93750 | YES | 346 |

Figure 13:
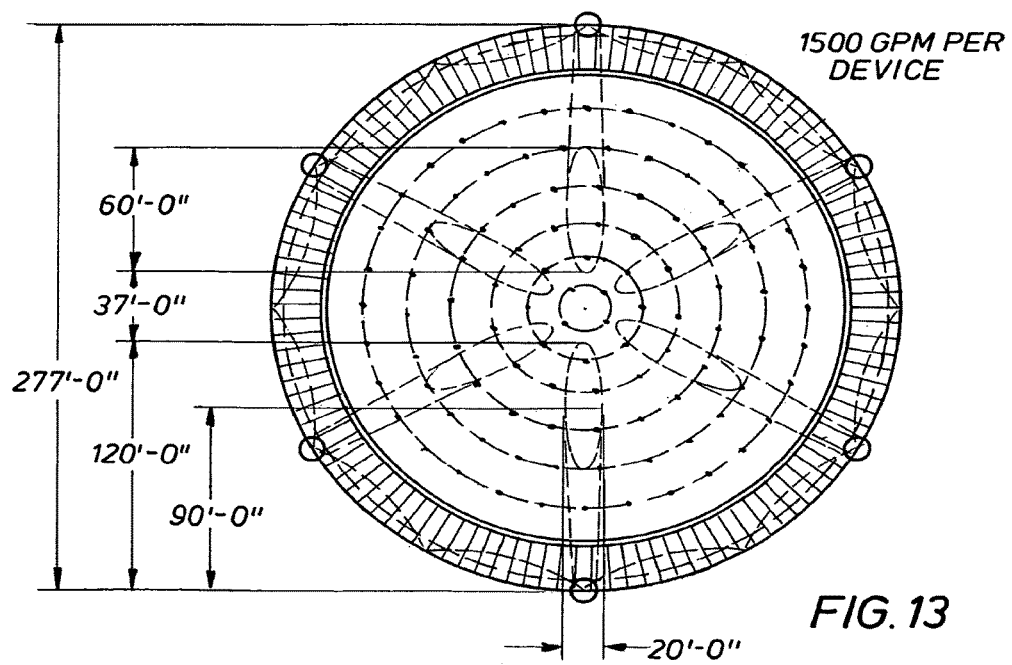
FIG. 13 illustrates staging three nozzle fixed wands around a 277 foot diameter tank, including flow per device, effective ranges and footprint size.

FIG. 13 illustrates configuring 6 three nozzle fixed system wands to cover a 277 foot diameter tank. Each device would flow 1500 gpm giving a total system flow of 9000 gpm.

FIG. 14 illustrates a riser RS and nozzle system appropriate for retro-fitting a tank with a fixed roof. The nozzle is designed such that it can be inserted into an opening near the top of the side of the tank wall. A center pointing nozzle CPN is provided with a tip TP. A pair of ports P are provided on each side of the nozzle, each port having a deflector DF which deflects foam from the conduit out the ports. An ambient air aeration chamber AAAC is provided on top of a riser RS.

FIG. 15 is a partial cross section of the embodiment of FIG. 14. It can be seen that a vapor seal VS is present between two flanges just above the jet nozzle TJ of the ambient air aeration chamber AAAC. The vapor seal is ruptured by a water stream when activating of the system. A better view of the deflectors DF proximate the ports P is given with the cutaway view, together with the location of the stream shaper SS and its fins FN in the tip TP of the center pointing nozzle CPN.

FIG. 16 affords a side view of the embodiment of FIG. 15, showing the nozzle affixed through a flanged opening FO of the tank wall TW.

FIG. 17 affords a full wand view of the embodiment of FIG. 14 with the riser RS attached to the wand head and the wand carrying the center pointing nozzle CPN.

FIG. 18 illustrates again the nozzle embodiment of FIG. 14 installed through an opening FO of a tank wall TW of tank T. FIG. 18 also illustrates the riser RS bringing water foam concentrate from proximate the ground up to the nozzle located proximally a top portion of the tank wall.

Figure 19A:
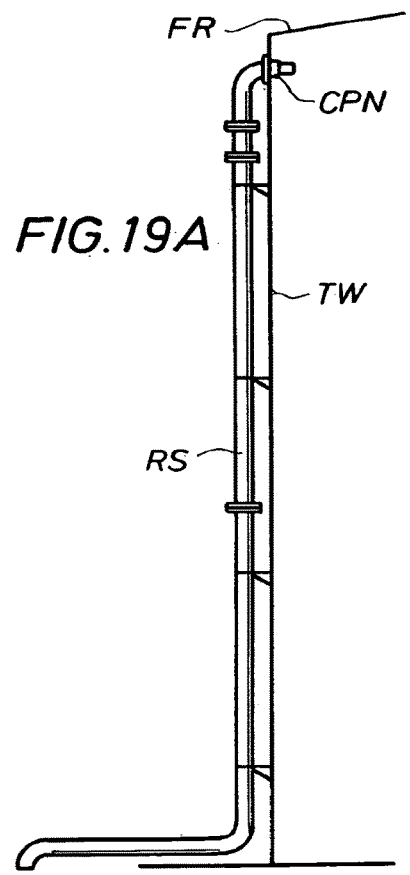
FIGS. 19A-19C show the embodiment of FIG. 14 together with the riser, attached to a tank wall and with an indication of further sourcing of water and foam concentrate.
Figure 19B:
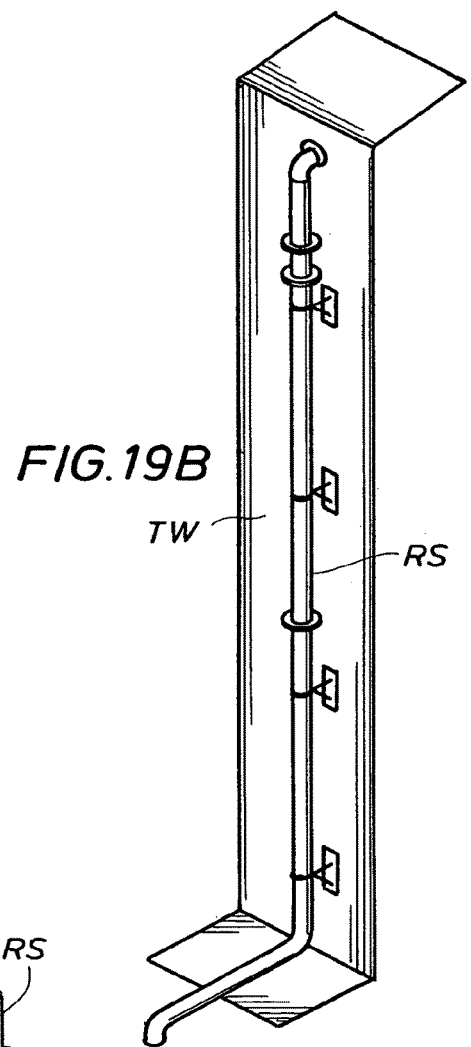
Figure 19C:
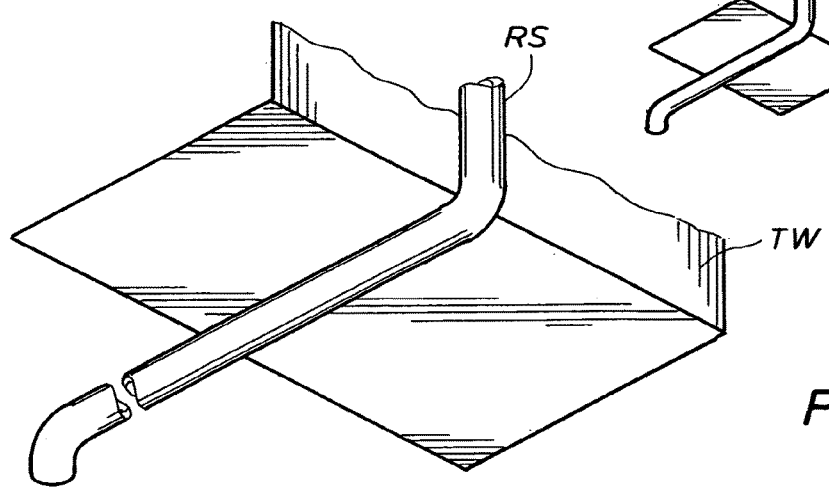

FIGS. 19A-19C illustrates a further installation of the nozzle embodiment of FIG. 14 in a tank wall TW under a fixed roof FR and including riser RS.

FIG. 20 illustrates a computation of the required number of embodiments of a nozzle for a fixed roof in accordance with the embodiment of FIG. 14, as per tank diameter. Each nozzle as per the embodiment of FIG. 14 is designed to discharge a 1000 gpm total.

The foregoing description of preferred embodiments of the invention is presented for purposes of illustration and description, and is not intended to be exhaustive or to limit the invention to the precise form or embodiment disclosed. The description was selected to best explain the principles of the invention and their practical application to enable others skilled in the art to best utilize the invention in various embodiments. Various modifications as are best suited to the particular use are contemplated. It is intended that the scope of the invention is not to be limited by the specification, but to be defined by the claims set forth below. Since the foregoing disclosure and description of the invention are illustrative and explanatory thereof, various changes in the size, shape, and materials, as well as in the details of the illustrated device may be made without departing from the spirit of the invention. The invention is claimed using terminology that depends upon a historic presumption that recitation of a single element covers one or more, and recitation of two elements covers two or more, and the like. Also, the drawings and illustration herein have not necessarily been produced to scale.

What is claimed is:

1. An aerated foam fire fighting apparatus structured for attachment to a tank with a fixed roof, comprising:
    an ambient air aeration chamber located upstream of, in fluid communication with, and proximate to, a nozzle, the ambient air aeration chamber structured to produce aerated foam; and
    the nozzle comprising:
        at least one stream shaper located in a tip portion of the nozzle, the at least one stream shaper having fins with a longitudinal dimension greater than a radial dimension, the fins terminating flush with an outermost end of the nozzle, wherein the nozzle is affixed to the tank so that the outermost end of the nozzle is positioned to discharge the aerated foam toward a center of the tank; and
        at least two discharge ports located in a fluid conduit between the ambient air aeration chamber and the outermost end of the nozzle, each discharge port of the at least two discharge ports having a deflector portion located in the fluid conduit proximate the respective discharge port, wherein the at least two discharge ports are positioned to discharge the aerated foam in opposing directions along an inner tank wall,
        wherein a diameter at the outermost end of the nozzle is smaller than a diameter at the at least two discharge ports.

2. The aerated foam fire fighting apparatus structured for attachment to the tank with a fixed roof of claim 1, including:
    the nozzle structured with the ambient air aeration chamber to project aerated foam in a substantially focused stream.

3. The aerated foam fire fighting apparatus of claim 1 or 2 wherein the ambient air aeration chamber is structured to produce aerated foam with an expansion ratio of between 2-to-1 and 8-to-1.

4. The aerated foam fire fighting apparatus of claim 3 including:
the nozzle structured to forcefully project between 200 gallons per minute (gpm) and 1000 gpm, at 100 pound per square inch (psi), of aerated foam; and
the at least two discharge ports including:
a pair of substantially opposing discharge ports upstream of the outermost end of the nozzle, with interior deflector surfaces structured to deflect a portion of fire fighting fluid passing through the conduit toward the at least two discharge ports.

5. The aerated foam fire fighting apparatus of claim 1 or 2 wherein the ambient air aeration chamber is structured to produce aerated foam with an expansion ratio of between 3-to-1 and 5-to-1.

6. The aerated foam fire fighting apparatus of claim 5 including:
the nozzle structured to project between 200 gallons per minute (gpm) and 1000 gpm, at 100 pound per square inch (psi), of aerated foam; and
the at least two discharge ports including;
a pair of substantially opposing discharge ports upstream of the outermost end of the nozzle, with interior deflector surfaces structured to deflect a portion of fire fighting fluid passing through the conduit toward the at least two discharge ports.

7. The aerated foam fire fighting apparatus of claim 1 or 2 including an at least 4 inch riser structured for communicating fire fighting fluid outside of an outer tank wall and in fluid communication with the aeration air aeration chamber.

8. The aerated foam fire fighting apparatus of claim 7 including a vapor membrane located between the riser and the aeration air aeration chamber.

9. The aerated foam fire fighting apparatus of claim 1 further comprising a conduit bend between the ambient air aeration chamber and the nozzle.

10. The aerated foam fire fighting apparatus of claim 9 wherein the conduit bend comprises a 90° bend.

11. The aerated foam fire fighting apparatus of claim 9 wherein the at least two discharge ports consist of two discharge ports; and
wherein the aerated foam, generated from the ambient air aeration chamber, exits only from the outermost end of the nozzle and the two discharge ports.

12. The aerated foam fire fighting apparatus of claim 9 further comprising a vapor seal between the conduit bend and the ambient air aeration chamber, wherein the vapor seal is ruptured by a water stream.

13. The aerated foam fire fighting apparatus of claim 1 wherein the nozzle consists of two discharge ports.

14. The aerated foam fire fighting apparatus of claim 1 further comprising a ring configured to connect the nozzle to a flanged opening of the tank.

15. The aerated foam fire fighting apparatus of claim 1, wherein the tip portion of the nozzle is cylindrical in shape; and
wherein the nozzle includes a tapered swedge down portion between the tip portion of the nozzle and the at least two discharge ports.

16. The aerated foam fire fighting apparatus of claim 15, wherein the tapered swedge down portion does not include the at least one stream shaper.

17. The aerated foam fire fighting apparatus of claim 16, wherein the at least two discharge ports are formed in the fluid conduit that is cylindrical in shape.

* * * * *